(12) United States Patent
Guidotti et al.

(10) Patent No.: US 7,873,557 B2
(45) Date of Patent: Jan. 18, 2011

(54) INFORMATION, DOCUMENT, AND COMPLIANCE MANAGEMENT FOR FINANCIAL PROFESSIONALS, CLIENTS, AND SUPERVISORS

(76) Inventors: Aaron Guidotti, 140 W. Gay St., Suite 200, West Chester, PA (US) 19380; Wayne Guidotti, 140 W. Gay St., Suite 200, West Chester, PA (US) 19380; John Guidotti, 140 W. Gay St., Suite 200, West Chester, PA (US) 19380

(*) Notice: Subject to any disclaimer, the term of this patent is extended or adjusted under 35 U.S.C. 154(b) by 427 days.

(21) Appl. No.: 12/039,436

(22) Filed: Feb. 28, 2008

(65) Prior Publication Data
US 2008/0270316 A1 Oct. 30, 2008

Related U.S. Application Data

(60) Provisional application No. 60/892,036, filed on Feb. 28, 2007.

(51) Int. Cl.
G06Q 40/00 (2006.01)
(52) U.S. Cl. ........................ 705/36 R; 705/37
(58) Field of Classification Search .......... 705/36 R–37
See application file for complete search history.

(56) References Cited

U.S. PATENT DOCUMENTS

| | | | |
|---|---|---|---|
| 2007/0244777 A1* | 10/2007 | Torre et al. | 705/35 |
| 2008/0040258 A1* | 2/2008 | Weber et al. | 705/37 |
| 2009/0037343 A1* | 2/2009 | Landle et al. | 705/36 R |

* cited by examiner

*Primary Examiner*—Thu Thao Havan
(74) *Attorney, Agent, or Firm*—Connolly Bove Lodge & Hutz LLP; Paul E. Crawford

(57) ABSTRACT

A method and system for integrating and managing information, documents, and compliance among financial professionals, financial professional clients, and financial professional supervisors. The method and system of the invention considers all information necessary for a financial professional to run their business and includes information relevant to the client and supervisor. This information includes full information management, electronic file management, compliance management, broker/dealer oversight, portfolio management, calendar management, and communications management. This information is presented to the financial professional, client, and supervisor in distinct yet integrated modules. Additionally, the method and system of the present invention offers tools for the financial professional, client, and supervisor that are relevant to their respective needs.

51 Claims, 65 Drawing Sheets

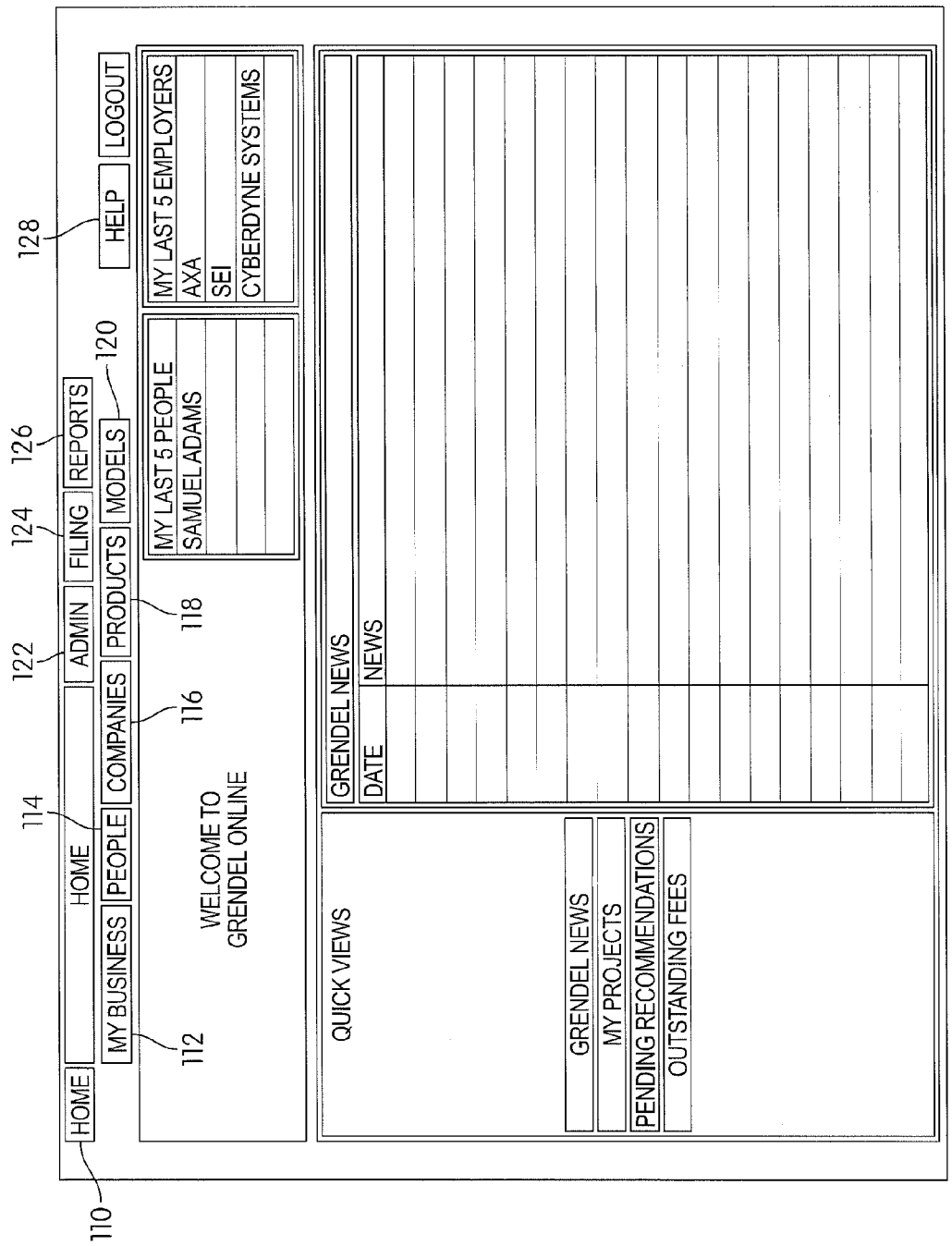
Fig. 1.0

| HOME | BUSINESS | | | |
|---|---|---|---|---|
| COMPLIANCE | PROJECTS | FORECASTING | PENDING RECOMMENDATIONS | |

PROJECTS — NEW

THE PROJECTS LISTED HERE ARE ALL OPEN PROJECTS FOR YOUR ENTIRE PRACTICE. THIS INCLUDES PROJECTS FROM CLIENTS AS WELL AS PROJECTS NOT LINKED TO ANY CLIENT. ONLY THE FIRST STEP, OR 'TOP LEVEL STEP IS SHOWN HERE. CLICK ON A PROJECT TO SEE ALL OF IT'S STEPS AND DETAILS. TO SEE ALL STEPS YOU ARE RESPONSIBLE FOR ACROSS ALL PROJECTS, CLICK 'MY STEPS'.

TEMPLATES
MY STEPS
SHOW COMPLETED

| PROJECTS | CLIENT | DETAILS | PRIORITY | DUE △ | STARTED | UPDATED |
|---|---|---|---|---|---|---|
| SAMPLE PROJECT | | | LOW | 10/19/2006 | | 01/18/2007 |
| RANGE | FATTALIKA, BEATTE | AC DETAIL | NORMAL | 10/04/2006 | | 10/27/2006 |
| QUEUE | FATTALIKA, BEATTE | HALIA REGISTER | NORMAL | 10/31/2006 | 10/31/2006 | |
| FINISH GRENDEL 2.0 | FATTALIKA, BEATTE | | NORMAL | 11/30/2006 | | 10/30/2006 |
| FINANCIAL HIGH | FATTALIKA, BEATTE | | NORMAL | 12/01/2006 | 11/02/2006 | 01/14/2007 |
| DEVELOPMENT PROJECT | DIAHLIA, BERT | | TOP | 12/31/2006 | | 01/14/2007 |
| CHRISTMAS SHOPPING | | GIFTS FOR ALL | HIGH | 12/31/2006 | 10/01/2006 | 10/30/2006 |
| AN AGE FOR MAGGIS | VAN KELMIERN, MAGGIE | | TOP | 12/31/2006 | | |

WHAT WOULD YOU LIKE TO DO?

210 → ⊞ CREATE A NEW PROJECT
212 → ⚲ SHOW COMPLETED PROJECTS
214 → ⚲ VIEW TEMPLATES

FILTER PROJECTS BY DUE DATE
DUE BEFORE [ ] ⊞
216 → ▷ APPLY THIS FILTER
☒ CLEAR THIS FILTER

Fig. 2.2

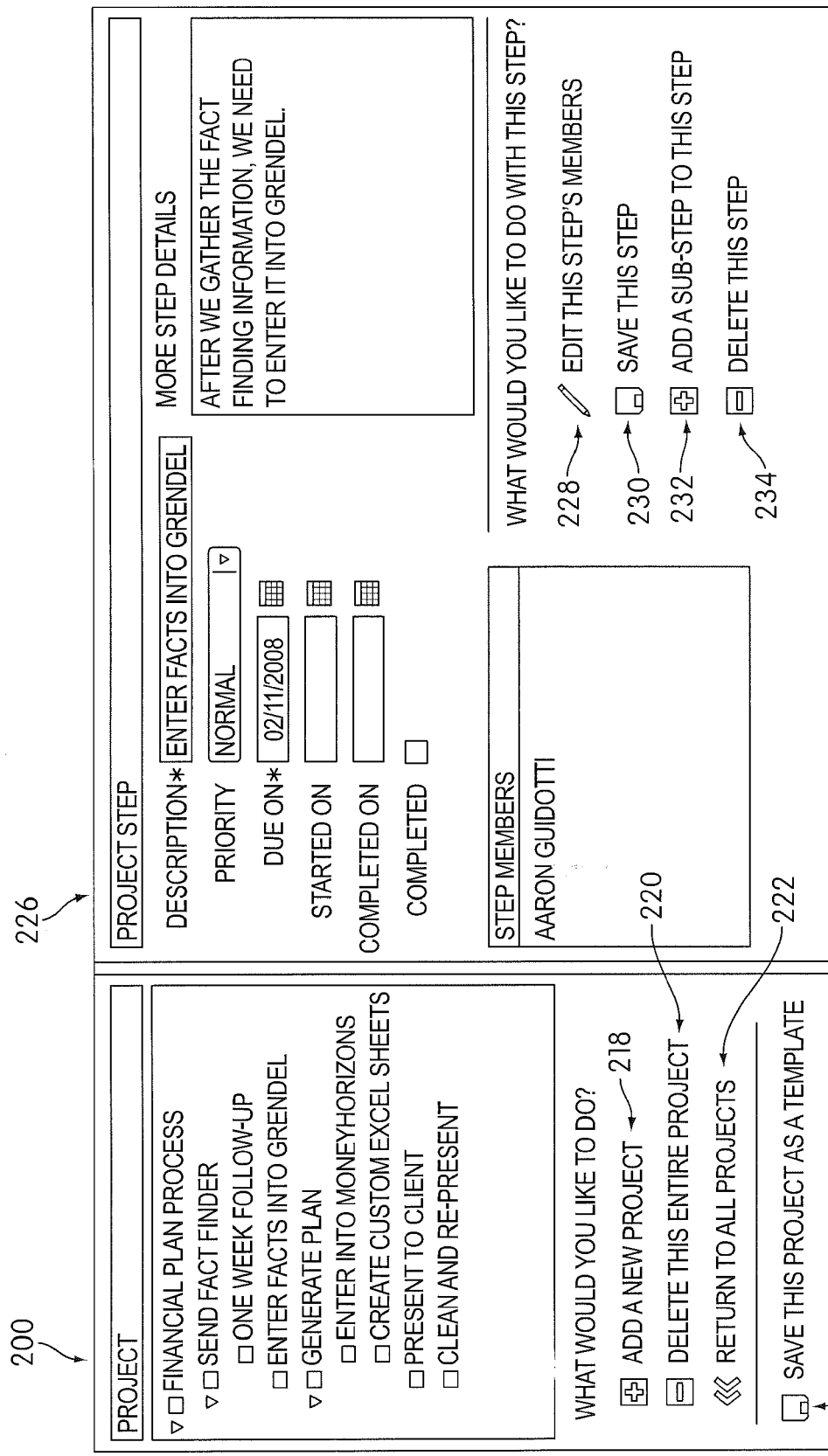
Fig. 2.2.1

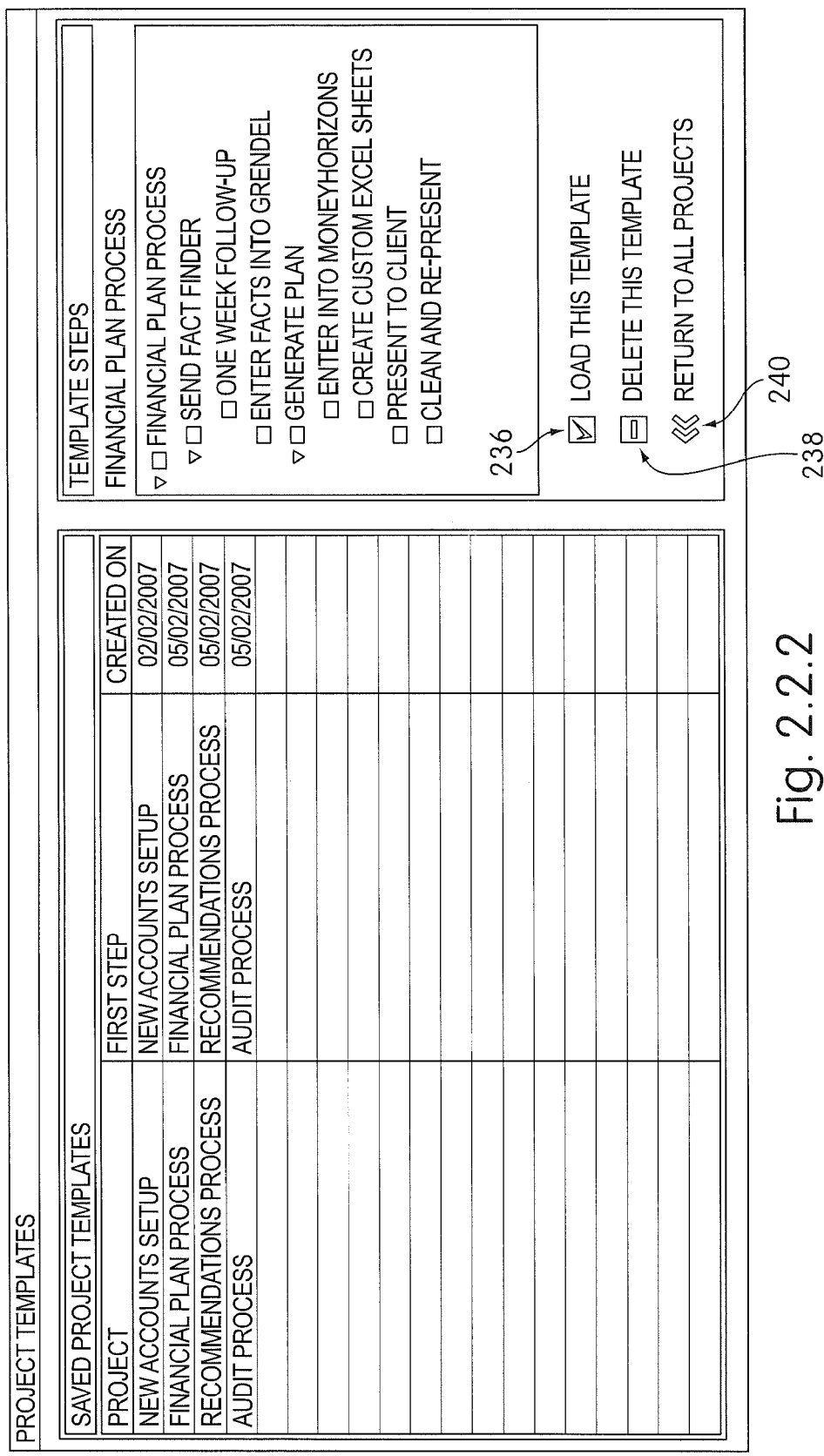
Fig. 2.2.2

| HOME | BUSINESS | | |
|---|---|---|---|
| COMPLIANCE | PROJECTS | FORECASTING | PENDING RECOMMENDATIONS |

TOTAL FORECAST ESTIMATE          SAVE

| | | |
|---|---|---|
| ASSET GROWTH | 1 % | |
| OUTSTANDING ADVISORY FEES | 6,000 | |
| ASSETS UNDER MANAGEMENT | 1,524,827 | |
| ASSETS WITH COMMISSIONS | 180,000 | |

| TIME PERIOD | FLAT | GROWTH |
|---|---|---|
| THIS MONTH | 7,924 | 7,928 |
| NEXT MONTH | 6,717 | 6,727 |
| THIS QUARTER | 21,357 | 21,387 |
| NEXT QUARTER | 20,148 | 20,229 |
| THIS YEAR | 81,801 | 82,225 |
| NEXT YEAR | 80,592 | 81,829 |

CREATE AND SAVE AN 'ASSET GROWTH' VALUE TO SEE HOW OVERALL MARKET CONDITIONS WOULD EFFECT ASSETS UNDER MANAGEMENT AS WELL AS COMMISSIONS AND TRAILS. OUTSTANDING FEES ONLY SHOW ADVISORY FEES THAT HAVE BEEN BILLED BUT NOT YET RECIEVED.

INCOME BY CLIENT

| OUTSTANDING ADVISORY FEES | | |
|---|---|---|
| CLIENT | DUE | AMOUNT |
| MOPPIE VAN KLAVEREN | 05/01/2007 | 6,000 |

| ASSETS UNDER MANAGEMENT INCOME - NEXT MONTH | | |
|---|---|---|
| CLIENT | FLAT | GROWTH |
| GERT DOEKES | 938 | 939 |
| PATE PATTAVINA | 5,778 | 5,787 |

| COMMISSION AND TRAIL INCOME - NEXT MONTH | | |
|---|---|---|
| CLIENT | FLAT | GROWTH |
| PATE PATTAVINA | 1 | 1 |

Fig. 2.3

COMMISSIONS AND TRAILS

COMMISSIONS SCHEDULES ARE GROUPED BY A SPECIFIC INVESTMENT PRODUCT. YOU MUST FIRST SELECT A PRODUCT BEFORE YOU CAN ADD, VIEW, OR CHANGE IT'S COMMISSION SCHEDULES.

PRODUCT [ AXA ACCUMULATOR ▽ ]

SCHEDULES

| SCHEDULE | COMMISSION | TRAILS |
|---|---|---|
| 4.25% WITH TRAIL | 4.25 | YES |
| 7% | 7 | NO |

SCHEDULE DETAIL

COMMISSION SCHEDULE* [ 4.25% WITH TRAIL ]

UPFRONT COMMISION* [ 4.25 ] %

TRAIL TIERS

| START MONTH | LAST MONTH | BASIS POINTS |
|---|---|---|
| 13 | INF | 50 |

[ NEW TRAIL ]

COMMISSIONS AND TRAILS

ASSET UNDER MANAGEMENT FEE SCHEDULES CAN BE APPLIED TO ANY ACCOUNT. YOU CAN ADD, VIEW, OR CHANGE ANY ASSET UNDER MANAGEMENT FEE SCHEDULE IN THIS ONE LOCATION.

FEE SCHEDULES

| FEE SCHEDULE | CALCULATION TYPE | ASSETS |
|---|---|---|
| FLAT 80 | FLAT | 3,250,000 |
| 100 BP GRADUATED MODEL | GRADUATED | 4,266,625 |
| FLAT 65 | FLAT | 3,750,000 |

SCHEDULE DETAIL

FEE SCHEDULE* [ 100 BP GRADUATED MODEL ]

CALCULATION TYPE* [ GRADUATED ▽ ]

AUM TIERS

| GREATER OR EQUAL | LESS THAN | BASIS POINTS |
|---|---|---|
| | 500,000 | 100 |
| 500,000 | 1,000,000 | 90 |
| 1,000,000 | 3,000,000 | 75 |
| 3,000,000 | INF | 50 |

[ NEW TIER ]

Fig. 2.3.1

| PENDING RECOMMENDATIONS | | | |
|---|---|---|---|
| CLIENT | ACCOUNT | DATE | VALUE |
| PETE PATTAVINA | AXA ANNUITY | 10/10/2007 | 375,000 |
| SARAH CONNOR | VANGUARD WINDSOR | 04/11/2007 | 350,000 |
| SARAH CONNOR | CONNECTICUT GENERAL WHOLELIFE | 04/26/2007 | 60,000 |
| CHRIS SIMPLETON | WELLS REIT | 04/05/2007 | 250,000 |
| CHRIS SIMPLETON | AXA ACCUMULATOR | 10/10/2007 | 1,000,000 |
| PAM TEMPONI | WELLS REIT | 10/10/2007 | 50,000 |
| CHUCK XAVIER | CNL INCOME | 10/10/2007 | 250,000 |
| CHUCK XAVIER | OPPENHEIMER HEDGE FUND | 10/10/2007 | 500,000 |
| SAMIR NAGAENAJAR | OPPENHEIMER HEDGE FUND | 10/10/2007 | 275,000 |
| | | | |
| | | | |
| | | | |

242

TOTAL RECOMMENDATIONS VALUE: 3,110,000

NO RECOMMENDATION SELECTED

SELECT A RECOMMENDATION FROM THE GRID ON THE LEFT TO GO DIRECTLY TO THE ACCOUNT.

NOTE: ITEMS APPEAR IN THIS LIST WHEN YOU SET AN ACCOUNT'S STAGE TO 'RECOMMENDED'

WOULD YOU LIKE TO DO SOMETHING ELSE?

🖨 PRINT THESE RECOMMENDATIONS

Fig. 2.4

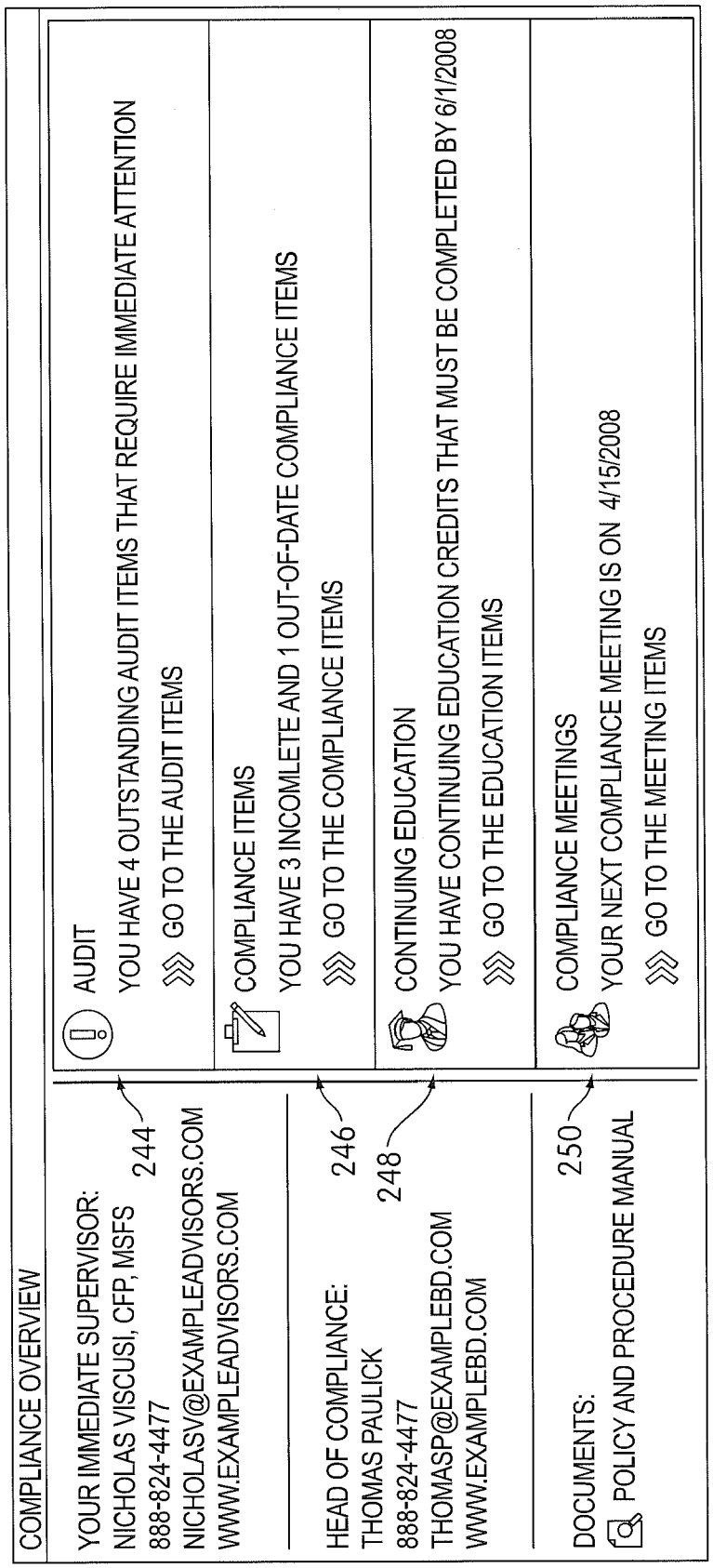
Fig. 2.5

| JOURNALS | | | |
|---|---|---|---|
| | DATE | CREATED BY | SUBJECT |
| 📞 | 02/04/2008 | AARON.DEMO | PETE CALLED REGARDING HIS LOSS-CAPTURE TAX EFFECT |
| 📞 | 02/27/2007 | AARON.DEMO | WE DISCUSSED HIS TAX SITUATION |
| 📞 | 02/02/2007 | WAYNE.DEMO | DISCUSSION REGARDING DIABILITY BENEFITS AT THE VP LEVEL |
| 📞 | 08/09/2005 | AARON.DEMO | STOCK OPTION AND REIT DISCUSSION |

NO JOURNAL SELECTED

SELECT A JOURNAL FROM THE GRID ON THE LEFT TO SEE ITS DETAILS.

WOULD YOU LIKE TO DO SOMETHING ELSE?

⊞ CREATE A NEW JOURNAL

✎ EDIT JOURNAL CATEGORIES

FILTER JOURNALS

CREATED BY [ ▷ ]

EVENT [ ▷ ]

CATEGORY [ ▷ ]

OCCURRED AFTER [ ]

OCCURRED BEFORE [ ]

▷ APPLY THIS FILTER

☒ CLEAR THIS FILTER

Fig. 3.3A

| JOURNALS | | |
|---|---|---|
| DATE * | 02/04/2008 | SUBJECT |
| | | PETE CALLED REGARDING LOSS-CAPTURE TAX EFFECT |
| TIME | 1:20 PM | ADDITIONAL JOURNAL |
| EVENT | PHONE | |
| ATTENDEES | AARON GUIDOTTI | |
| | PETE PATTAVINA | |
| | | EXISTING JOURNAL |
| CATEGORY | INVESTMENTS | AARON GUIDOTTI 02/04/2008 | PETE CALLED AND WANTED TO DISCUSS HIS TAX SITUATION. SPECIFICALLY, HE WANTED TO KNOW HOW HIS LOSS-HARVESTING WE IMPLEMENTED AT THE AND OF '07 WOULD EFFECT HIS TAXES. I TOLD HIM THAT I NEEDED TO DO SOME RESEARCH AND CALL HIM BACK. |
| | TAXES | |
| SET FLAG ☐ | | ROGIER DOEKES 02/08/2008 | I CALLED PETE AND HE IS SENDING ME HIS TAX DOCUMENTS |
| WHAT WOULD YOU LIKE TO DO? | | |
| ☐ SAVE THIS JOURNAL | | |
| ☒ CLOSE WITHOUT SAVING | | |
| ☐ DELETE THIS JOURNAL | | |
| ✎ ASSIGN ATTENDEES | | |
| ✎ ASSIGN CATEGORIES | | |
| 🖶 PRINT THIS JOURNAL | | |

Fig. 3.3B

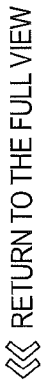
Fig. 3.3C

OPEN PROJECTS FOR THIS CLIENT

| PROJECTS | DETAILS | PRIORITY | DUE | STARTED | UPDATED |
|---|---|---|---|---|---|
| FINANCIAL PLAN PROCESS | | NORMAL | 02/11/2008 | | |
| MEETING WITH ACCOUNTANT | NEED TO MEET WITH THE PATTAVINA'S ACCOUNTANT TO DISCUSS THEIR CAPITA | NORMAL | 08/22/2007 | | 02/08/2008 |
| ESTATE DOCUMENTS | PETE GAVE US HIS ESTATE DOCUMENTS. WE NEED TO REVIEW THEM BEFORE | NORMAL | 08/17/2007 | 08/03/2007 | 08/07/2007 |
| | | | | | |
| | | | | | |
| | | | | | |

MY PROJECT STEPS FOR THIS CLIENT

| DETAILS | STEP | PRIORITY | DUE |
|---|---|---|---|
| FINANCIAL PLAN PROCESS | ENTER FACTS INTO GRENDEL | NORMAL | 02/11/2008 |
| FINANCIAL PLAN PROCESS | GENERATE PLAN | NORMAL | 03/01/2008 |
| | | | |
| | | | |
| | | | |
| | | | |

WHAT WOULD YOU LIKE TO DO?

⊞ CREATE A NEW PROJECT
🔍 SHOW COMPLETED PROJECTS
🔍 VIEW TEMPLATES

FILTER PROJECTS BY DUE DATE

DUE BEFORE [         ] ⊞

▷ APPLY THIS FILTER
☒ CLEAR THIS FILTER

Fig. 3.4

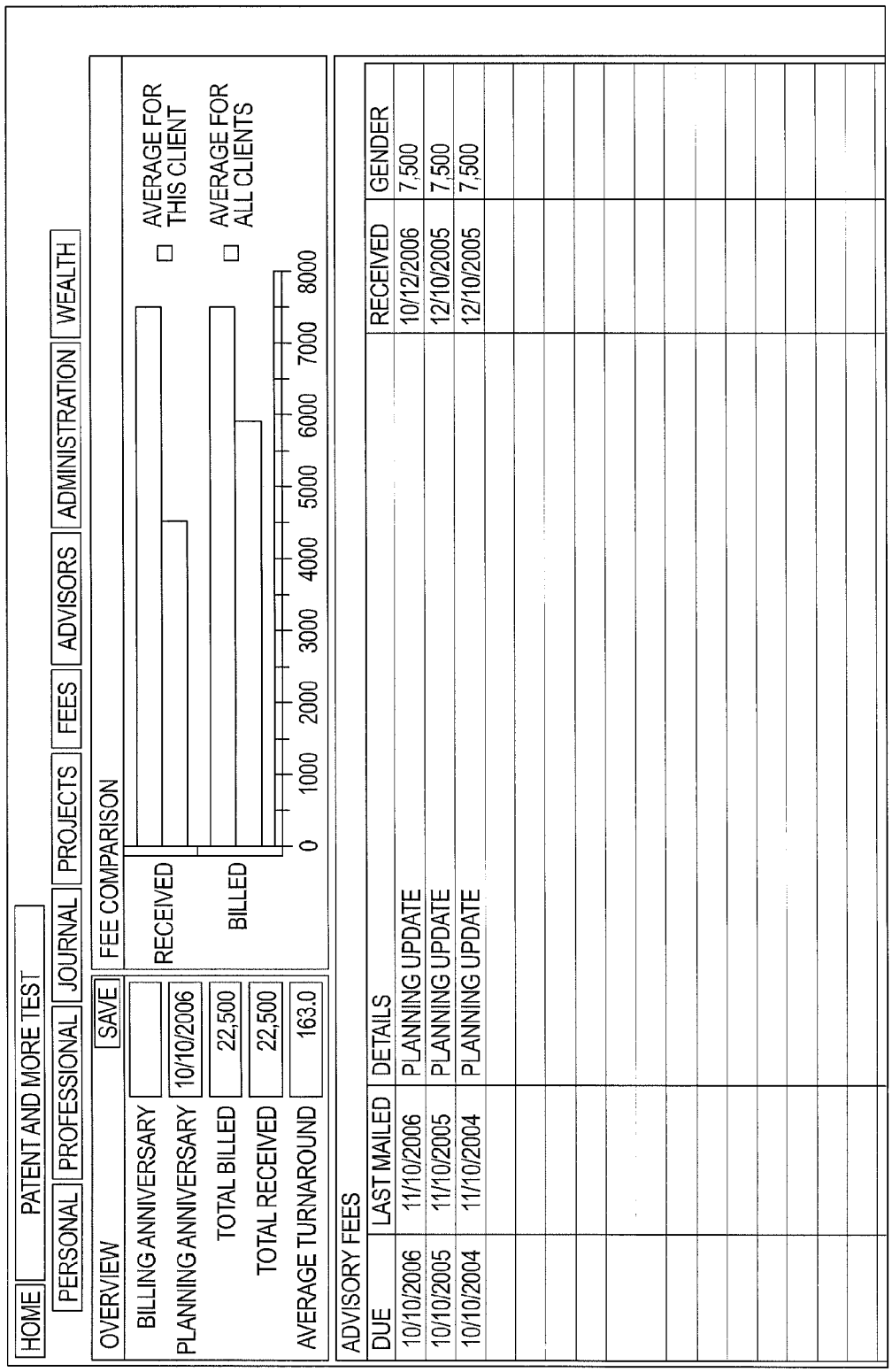
Fig. 3.5

| HOME | PATENT AND MORE TEST | | | | | | | |
|------|----------------------|--|--|--|--|--|--|--|
| PERSONAL | PROFESSIONAL | JOURNAL | PROJECTS | FEES | ADVISORS | ADMINISTRATION | WEALTH | |

| ADVISORS | | | | | | | MANAGE ADVISORS |
|----------|------------|----------|------------|------------|-------------|----------|------------------|
| ADVISOR | OCCUPATION | EMPLOYER | WORK PHONE | WORK MOBILE | WORK FAX | WORK EMAIL | |
| SARAH CONNOR | WAITRESS | | (123) 456-7890 | | | | |
| AARON GUIDOMON | THINKER | BBW | (222) 222-2222 | | | AARONG@CAPS.MMM | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

Fig. 3.6

| HOME | PATENT AND MORE TEST | | | | | | |
|---|---|---|---|---|---|---|---|
| PERSONAL | PROFESSIONAL | JOURNAL | PROJECTS | FEES | ADVISORS | ADMINISTRATION | WEALTH |

CLIENT ADMINISTRATION

RELATIONSHIP

THE INFORMATION BELOW IS MOST OFTEN USED FOR FILTERING DURING SEARCHES OR REPORT CREATION.

- CLIENT TYPE: PLANNING ▾
- CLIENT GRADE: A+ ▾
- KNOWN CLIENT SINCE: 2003
- REFERRED BY: SARAH CONNOR

IDENTIFICATION

AT LEAST ONE OF THE ITEMS BELOW ARE REQUIRED FOR EACH NEW ACCOUNT OPENED.

CLIENT
- DRIVER'S LICENSE: AA555555B
- PASSPORT:
- ID CARD: P9999999
- ALIEN REGISTRATION CARD:

CO-CLIENT
- DRIVER'S LICENSE:
- PASSPORT:
- ID CARD:
- ALIEN REGISTRATION CARD:

CLIENT ACCESS TO GRENDEL   [SAVE]

THIS CLIENT HAS BEEN GRANTED ACCESS. CLICK 'RESET PASSWORD' TO HAVE GRENDEL SEND AN EMAIL TO YOUR CLIENT WITH A NEW TEMPORARY PASSWORD. CLICKING 'CLIENT VIEW' ALLOWS YOU TO SEE WHAT THE CLIENT SEES WHAT THE CLIENT SEES WHEN LOGGING ON. 'REMOVE ACCESS' REMOVES YOUR CLIENT'S ACCESS TO GRENDEL.

- ACCESS GRANTED ON:
- LAST LOGGED IN:
- TIMES LOGGED IN:
- LOGIN ID:
- EMAIL: ▾
- [RESET PASSWORD]
- [CLIENT VIEW] [REMOVE ACCESS]

EMAIL PREFERENCE

CHECK THE EMAILS THAT THE CLIENT PREFERS YOU TO USE

- PERSONAL CLIENT ☐ PATENT@COMCAST.III
- PERSONAL CO-CLIENT ☐
- WORK CLIENT ☐ PATENT@III.COM
- WORK CO-CLIENT ☐

Fig. 3.7

CLIENT PERMISSIONS

ACCESS GRANTED

THIS CLIENT HAS ACCESS TO THE GRENDEL CLIENT APPLICATION.

THIS CLIENT                                         ALL CLIENTS

LOGIN ID:        PETE.PATTAVINA            CLIENTS WITH ACCESS:  2
ACCESS STATUS:   GRANTED                         TOTAL LOGINS:  40
ACCESS GRANTED ON: 10/30/2006                 REMAINING LOGINS:  38
LAST LOGGED IN ON: 10/25/2007
TIMES LOGGED IN: 51

WHAT WOULD YOU LIKE TO DO?

🌐  VIEW THE CLIENT'S GRENDEL SITE

📁  MANAGE FILES THE CLIENT CAN VIEW

310 → 🔑  RESET CLIENT PASSWORD

312 → 🔒  UNLOCK CLIENTS ACCOUNT

314 → ▭  REMOVE ACCESS TO GRENDEL

«  RETURN TO CLIENT ADMIN

Fig. 3.7.1

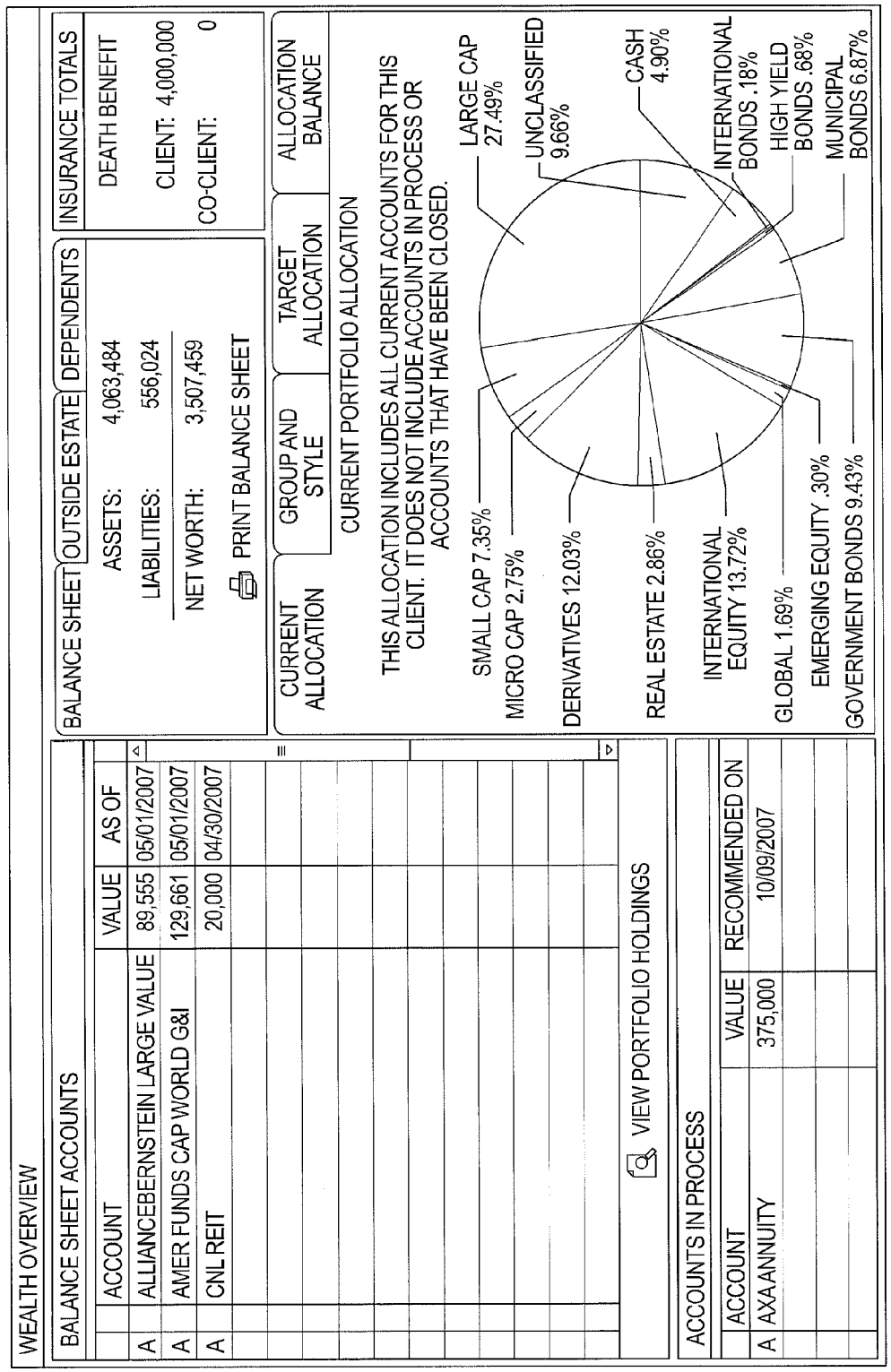
Fig. 3.8A

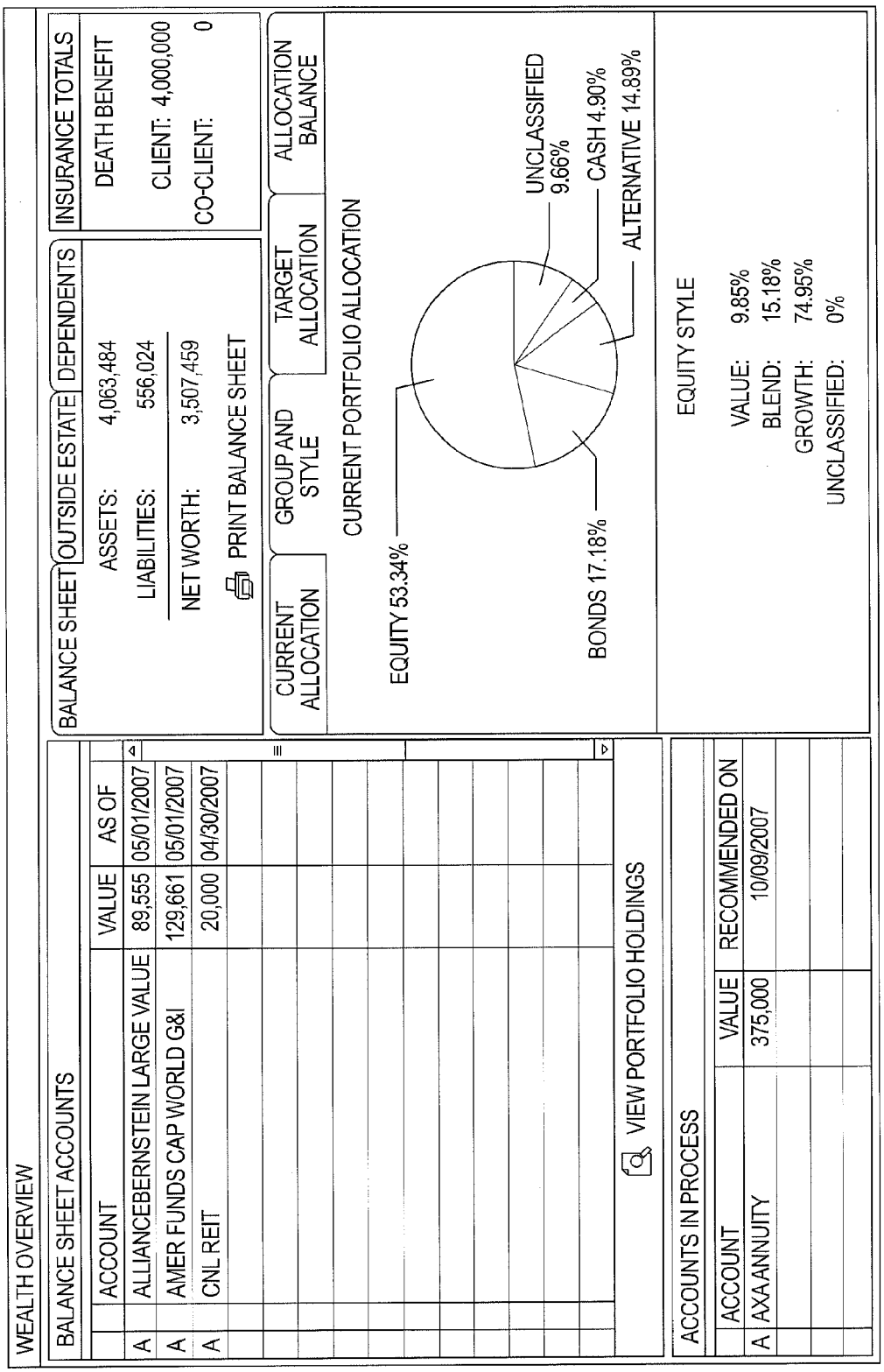
Fig. 3.8B

WEALTH OVERVIEW

BALANCE SHEET ACCOUNTS

| | ACCOUNT | VALUE | AS OF |
|---|---|---|---|
| A | ALLIANCEBERNSTEIN LARGE VALUE | 89,555 | 05/01/2007 |
| A | AMER FUNDS CAP WORLD G&I | 129,661 | 05/01/2007 |
| A | CNL REIT | 20,000 | 04/30/2007 |

🔍 VIEW PORTFOLIO HOLDINGS

ACCOUNTS IN PROCESS

| | ACCOUNT | VALUE | RECOMMENDED ON |
|---|---|---|---|
| A | AXA ANNUITY | 375,000 | 10/09/2007 |

BALANCE SHEET / OUTSIDE ESTATE / DEPENDENTS / INSURANCE TOTALS

ASSETS: 4,063,484  
LIABILITIES: 556,024  
NET WORTH: 3,507,459

DEATH BENEFIT  
CLIENT: 4,000,000  
CO-CLIENT: 0

🖨 PRINT BALANCE SHEET

CURRENT ALLOCATION / GROUP AND STYLE / TARGET ALLOCATION / ALLOCATION BALANCE

TARGET INVESTMENT MODEL ALLOCATION

SELECT THE INVESTMENT MODEL ALLOCATION THAT YOU WISH TO ASSIGN AS A TARGET MODEL FOR THIS CLIENT. YOU CAN ADD OR CHANGE INVESTMENT MODELS FROM THE 'MODELS' SECTION OF GRENDEL.

INVESTMENT MODEL: [80-20 AGGRESSIVE ▾]  [UPDATE MODEL]

SELECTED INVESTMENT MODEL: 80-20 AGGRESSIVE

- LARGE CAP 40.00%
- CASH 1.30%
- INTERNATIONAL BONDS 1.75%
- INTERNATIONAL EQUITY 22.25%
- MID CAP 7.50%
- SMALL CAP 7.50%
- COMMODITIES 10.00%
- REAL ESTATE 9.70%

Fig. 3.8C

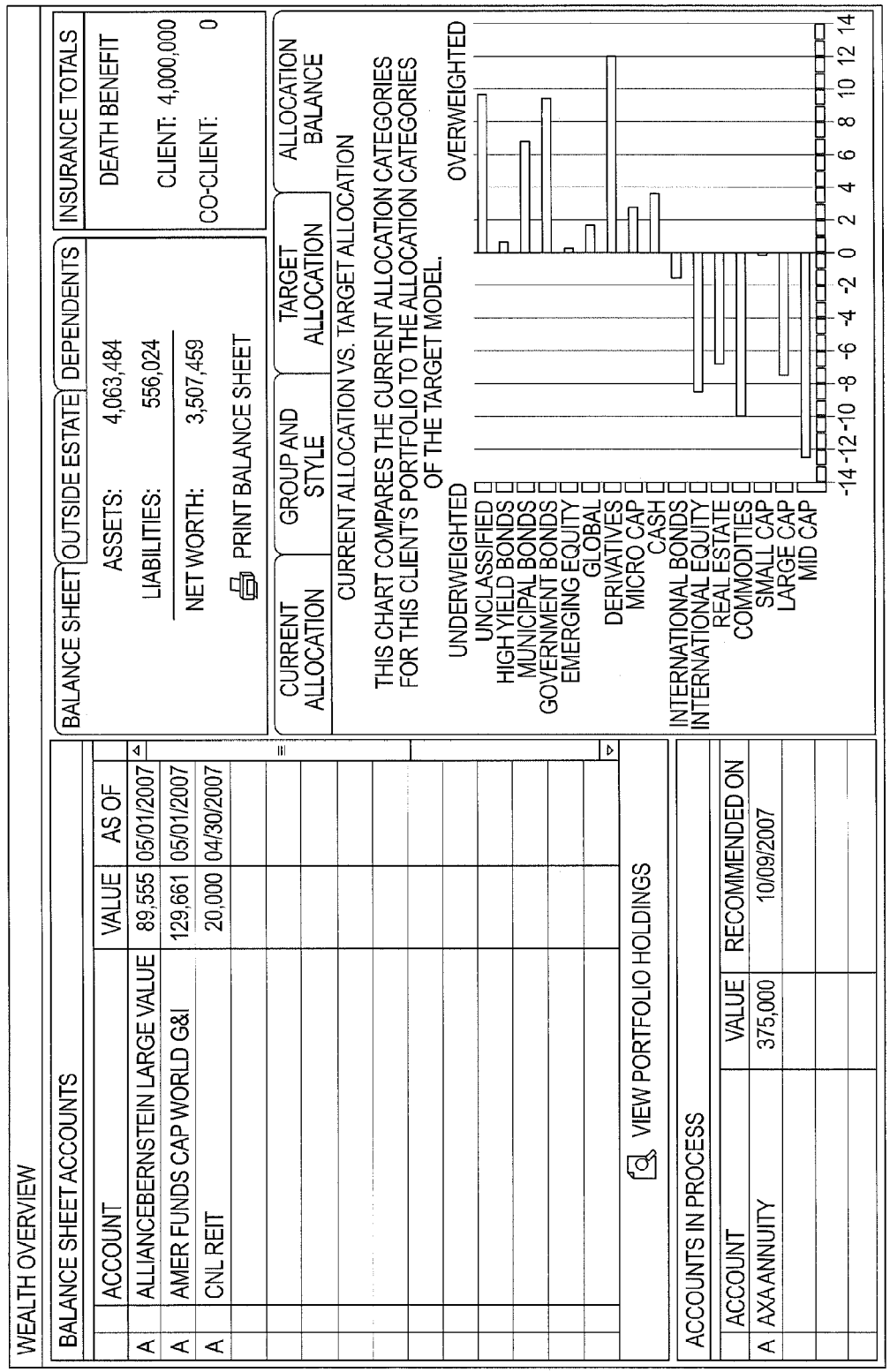
Fig. 3.8D

| HOME | | | | | | |
|---|---|---|---|---|---|---|
| BACK | ALL ASSETS | ALLOCATION | HOLDINGS/GRANTS | | SHOW CLOSED | LOGOUT |
| ASSETS | | | | | | |
| ASSET | OWNER | ACCOUNT NUMBER | ACCOUNT TYPE | STAGE | BASIS | NEW VALUE |
| MY GOLD | UNASSIGNED | 999 | NON-QUALIFIED | INVESTED | 90,000 | 100,000 |
| MY MUTUAL FUNDS | UNASSIGNED | AD9999 | 401(K) | INVESTED | 0 | 750,000 |
| WELLS REIT | UNASSIGNED | XXXXXX | NON-QUALIFIED | RECOMMENDED | 50,000 | 50,000 |
| HEDGE FUND | UNASSIGNED | ZZZZZ22222 | NON-QUALIFIED | IN PROCESS | 50,000 | 50,000 |
| SEPERATE ACCOUNT MOANGER | UNASSIGNED | SE12121212 | IRA (TRADITIONAL) | INVESTED | 0 | 1,297,000 |
| SC STOCK OPTIONS | UNASSIGNED | | NON-QUALIFIED | IN PROCESS | 0 | 97,000 |
| SC RESTRICTED STOCK | UNASSIGNED | | NON-QUALIFIED | INVESTED | 0 | 50,000 |
| MY BANK CHECKING | UNASSIGNED | $$$$$$$$$$$1111111 | NON-QUALIFIED | INVESTED | | 49,751 |
| OUR HOUSE | UNASSIGNED | | | | 650,000 | 825,000 |
| | | | | | | |
| | | | | | | |
| | | | | | TOTALS 840,000 | 3,268,751 |

Fig. 3.8.2

| HOME | | ADMIN | FILING | REVENUE | | |
|---|---|---|---|---|---|---|
| HOME | ALL ASSETS | ASSETS | ALLOCATION | HOLDINGS/GRANTS | HISTORY | |

ASSET           SHOW CLOSED    LOGOUT

ACCOUNT DETAILS

| | |
|---|---|
| ASSET NAME | MY GOLD |
| ACCOUNT NUMBER | 999 |
| OWNERSHIP | ▷ |
| ACCOUNT TYPE | NON-QUALIFIED ▷ |
| STAGE | INVESTED ▷ |
| RECOMMENDED ON | 12/12/2005 |
| OPENED ON | 12/25/2005 |
| CDSC FREE ON | |
| CLOSED ON | |
| CLOSED | ☐ |

VALUES

| | |
|---|---|
| VALUE | 100,00.00 |
| VALUE AS OF | 01/25/2007 |
| BASIS | 90,000.00 |
| BASIS AS OF | 12/12/2005 |
| FUNDED BY | UNCLE JOE |
| AGGREGATION LINK | ☐ |

INVESTMENT LINK AND PAYOUT    NEW

| | |
|---|---|
| INVESTMENT LINK | ▷ |
| COMMISSION MODEL | ▷ |
| COMMISSION PAID | ☐ |
| AUM MODEL | ▷ |

MISCELLANEOUS

| | |
|---|---|
| NON INVESTMENT | ☐ |
| DISCRETION | ☐ |
| INVESTMENT ADVISORY | ☐ |
| CURRENT REP | ☐ |

OWNERSHIP

| OWNER | PERCENT |
|---|---|
| | |
| | |
| | |

BENEFICIARIES    NEW

| BENEFICIARY | LEVEL | PERCENT |
|---|---|---|
| | | |
| | | |
| | | |

ASSOCIATED LIABILITIES    NEW

| LIABILITY | AMOUNT |
|---|---|
| | |
| | |
| | |

Fig. 3.8.2.1

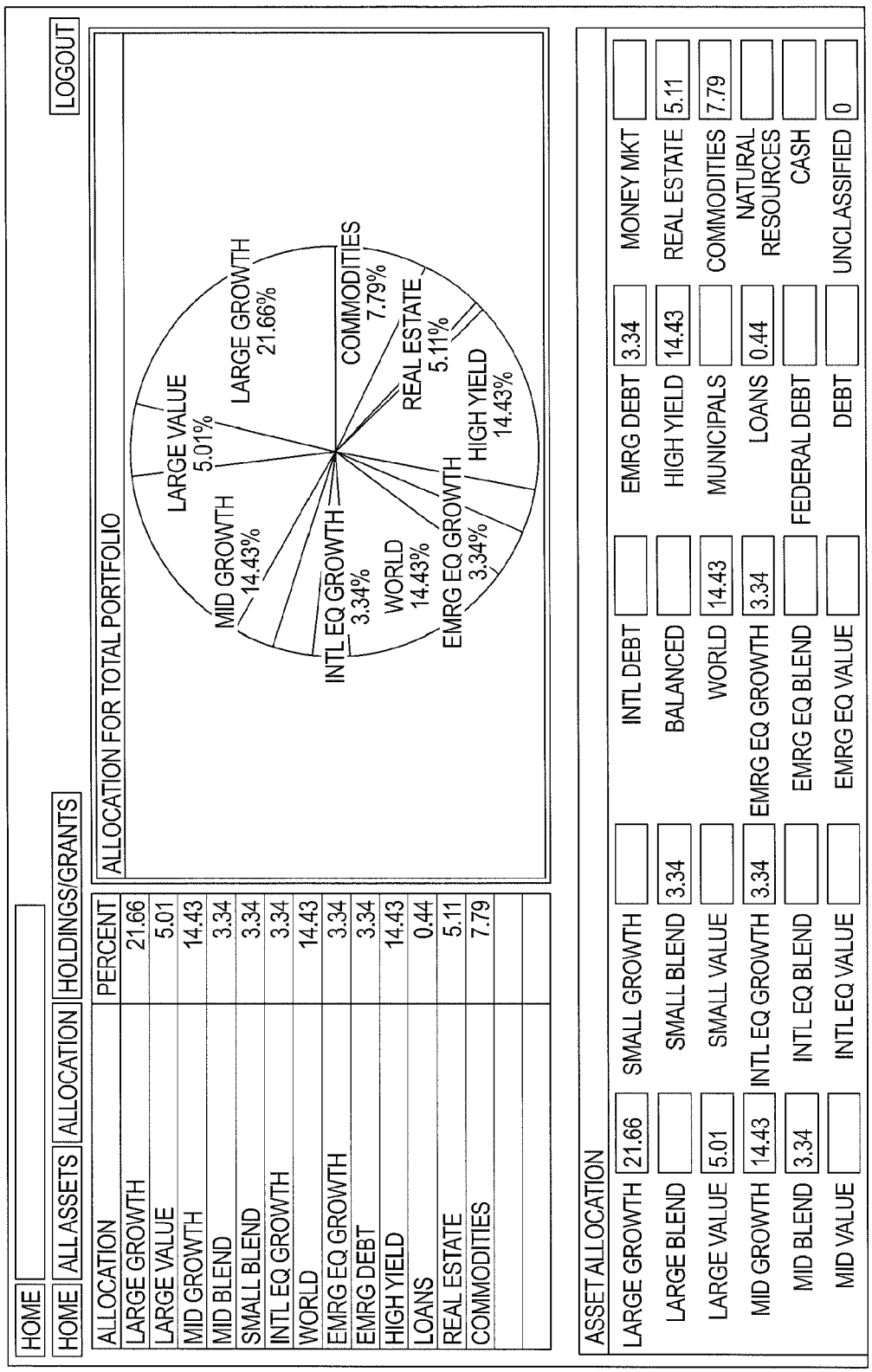
Fig. 3.8.2.2

| HOLDING | | | | | | |
|---|---|---|---|---|---|---|
| HOLDING | DODGE & COX INTERNATIONAL | PRICE | 40.7000 | BASIS | 0 | AS OF 01/23/2008 |
| TICKER | DODFX | UNITS | 259.816 | VALUE | 10,574.51 | ALLOCATION INTERNATIONAL EQUITY |
| | | | | | | EQUITY STYLE GROWTH |

| HOLDING | | | | | | |
|---|---|---|---|---|---|---|
| HOLDING | ASSET | ASSET TYPE | ALLOCATION | BASIS | VALUE | GAIN/LOSS | PERCENT |
| THE FAIRHOLME FUND | IRA ROLLOVER | REGULAR ASSET | | 0 | 10,296 | 10,296 | 10.56 |
| DODGE & COX INTERNATIONAL FU | IRA ROLLOVER | REGULAR ASSET | INTERNATIONAL EQUITY | 0 | 10,574 | 10,574 | 10.84 |
| U S GLOBAL ACCOLADE EASTERN | IRA ROLLOVER | REGULAR ASSET | | 0 | 7,413 | 7,413 | 7.60 |

Fig. 3.8.2.3

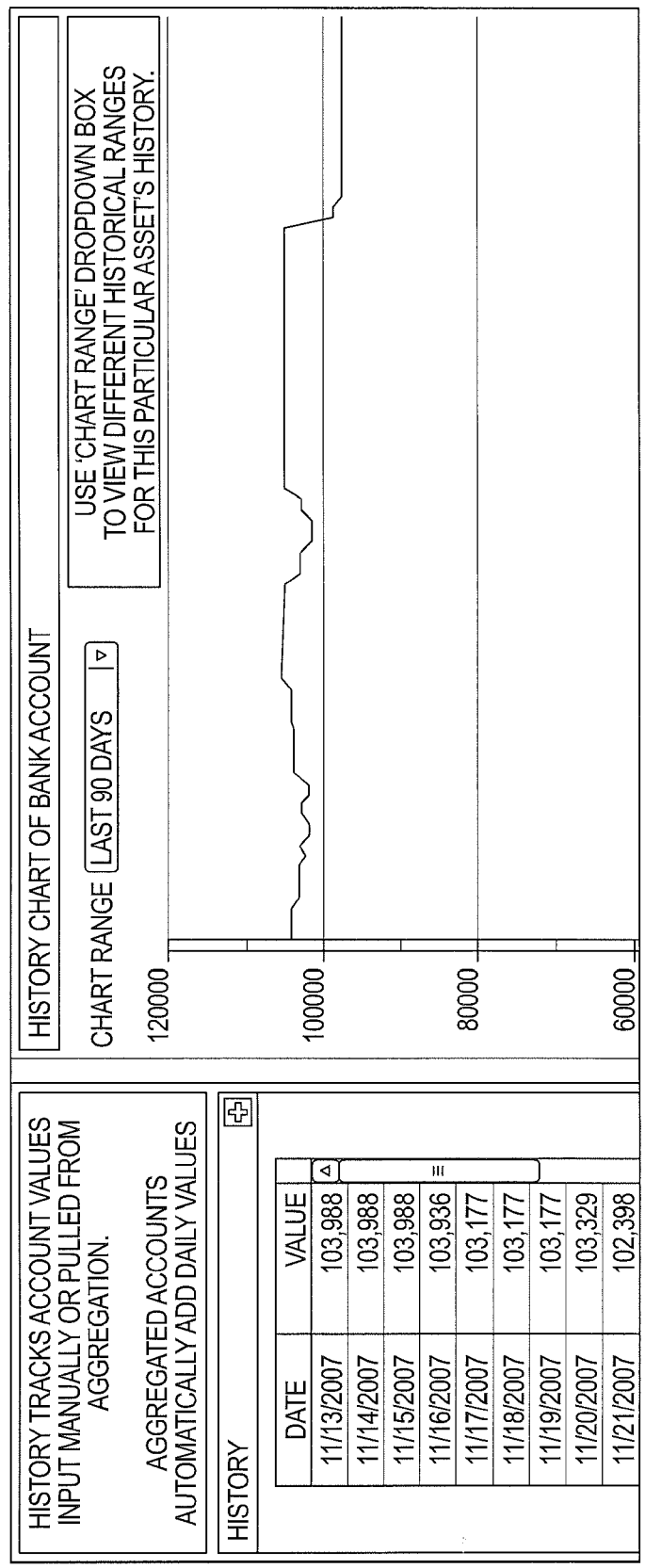
Fig. 3.8.2.4

| INSURANCE | | | | | | SHOW TERMINATED ⊞ | |
|---|---|---|---|---|---|---|---|
| POLICY | INSURED | POLICY TYPE | POLICY NUMBER | ISSUED ON | STAGE | FACE AMOUNT | CASH VALUE |
| GROUP POLICY | PETE PATTAVINA | TERM | AB159260 | 03/01/1985 | | 1,000,000 | |
| JOHN HANCOCK | PETE PATTAVINA | VARIABLE UNIVERSAL | UVL923813-31325 | | COMPLETED | 2,000,000 | 83,200 |
| NATIONWIDE POLICY | PETE PATTAVINA | VARIABLE UNIVERSAL | 1231-NAN | 07/21/2006 | COMPLETED | 1,000,000 | |
| | | | | | | | |
| | | | | | | | |
| | | | | | TOTALS | 4,000,000 | 83,200 |

Fig. 3.8.3

Fig. 3.8.4

| LIABILITIES | | | | | | |
|---|---|---|---|---|---|---|
| LIABILITY | TYPE | LINKED ASSET | AGGREGATION LINK | PAYMENT | ORIGINAL | CURRENT |
| MAIN MORTGAGE | MORTGAGE | MAIN LINE RESIDENCE | | 3,500 | 600,000 | 550,000 |
| LOAN TO FRANNY | FAMILY LOAN | | | | | 1,151 |
| STUDENT LOAN | | | | | 8,500 | 1,923 |
| STUDENT LOAN 2 | | | | | 8,500 | 1,923 |
| CREDIT CARD | | | BLUE FROM AMERICAN EXPRE | | | 1,025 |

Fig. 3.8.5

| INCOME SOURCES | | | | |
|---|---|---|---|---|
| INCOME | OWNER | SOURCE | TAXES | AMOUNT |
| SALARY | PETE PATTAVINA | CYBERDYNE | BEFORE TAX | 285,000 |
| INHERITANCE | PETE PATTAVINA | PETE'S MOTHER | BEFORE TAX | 1,200,000 |
| BONUS | PETE PATTAVINA | CYBERDYNE | BEFORE TAX | 160,000 |
| | | | | |

Fig. 3.8.6

ESTATE DETAIL

| | | |
|---|---|---|
| DESCRIPTION | INNER CITY CHILDREN TRUST | |
| TYPE | TRUST (IRREVOCABLE) | |
| CREATED ON | 11/03/2004 | |
| SIGNED BY | ☑ | |
| GRANTOR | PETE PATTAVINA | |
| TAX ID | 653-6656-222 | |

| DETAILS |
|---|
| TRUST SETUP TO SPONSOR LEARNING PROJECTS FOR INNER CITY CHILDREN. FRANNY HEADS UP THE TRUST. |

| TRUSTEES |
|---|
| TRUSTEE |
| FRAN PATTAVINA |

| ACCOUNTS | |
|---|---|
| DODGE AND COX INTERNATIONAL | 75,659 |
| AMER FUNDS CAP WORLD G&I | 129,661 |
| ALLIANCEBERNSTEIN LARGE VALUE | 89,555 |
| | |
| | |

ESTATE DOCUMENTS AND ENTITIES

| DESCRIPTION | TYPE | CREATED ON | SIGNED |
|---|---|---|---|
| PETE'S WILL | WILL (LIVING) | 06/15/2006 | NO |
| INNER CITY CHILDREN TRUST | TRUST (IRREVOCABLE) | 11/03/2004 | YES |
| PETE'S MEDICAL DIRECTIVES | MEDICAL DIRECTIVE | 10/10/2006 | YES |

Fig. 3.8.7

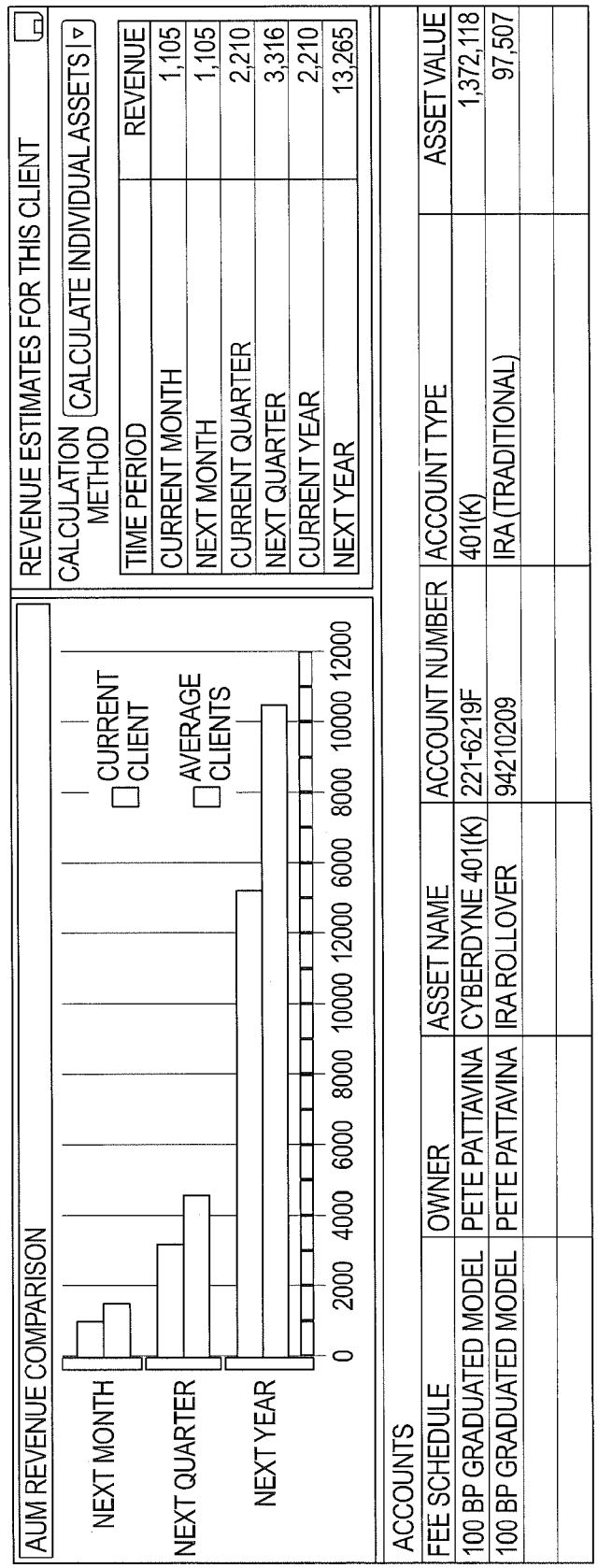
Fig. 3.8.8

| ⚛ AGGREGATION | | |
|---|---|---|
| INSTITUTION | LAST UPDATE | STATUS |
| AMERICAN EDUCATION SERV | 02/06/2008 | INSTITUTION UNAVAILABLE |
| AMERICAN EXPRESS | 02/10/2008 | OK |
| CITIBANK CREDIT CARDS | 02/10/2008 | OK |
| ROYAL ALLIANCE ADVISOR (A | 01/23/2008 | INCORRECT CREDENTIALS |
| WACHOVIA SECURITIES | 02/10/2008 | OK |

| DETAILS FOR CITIBANK CREDIT CARDS | | |
|---|---|---|
| L ACCOUNT | ACCOUNT | VALUE |
| CITI DIVIDEND WORLD MASTE | XXXX-XXXX-XXXX-2648 | 1,212 |
| CITI MASTERCARD | XXXX-XXXX-XXXX-5397 | |

STATUS: THIS INSTITUTION IS AGGREGATING CORRECTLY

WHAT WOULD YOU LIKE TO DO WITH THIS STEP?

- ♻ REFRESH THIS INSTITUTION
- ✎ UPDATE LOGIN INFORMATION
- 🌐 VIEW WEB SITE
- ⊞ ADD ANOTHER INSTITUTION
- ⊟ REMOVE THIS INSTITUTION

Fig. 3.8.9

ESTATE DETAIL

PERSONAL

| Field | Value |
|---|---|
| FIRST NAME | DENNY |
| MIDDLE NAME | |
| NICKNAME | |
| LAST NAME | CRANE |
| BIRTHDAY | 3/22/1931    76.91 |
| SSN | 123-45-6789 |
| MOBILE PHONE | (123) 456-7890 |
| EMAIL | DENNY@DCRANE.COM |

PROFESSIONAL

| Field | Value | | Field | Value |
|---|---|---|---|---|
| WORK PHONE | (303) 123-4569 | | OCCUPANT | ATTORNEY |
| WORK MOBILE | (303) 234-5678 | | POSITION | PARTNER |
| WORK FAX | (303) 345-6789 | | DEPARTMENT | LEGAL |
| WORK EMAIL | D.CRANE@CPSLEGAL.COM | | EMPLOYER | CRANE, POOLE, AND SCHMIDT |
| ASSISTANT | MELISSA | | LOCATION | |
| ASSISTANT PHONE | (303) 321-4567 | | EXTRA | 18TH FLOOR |
| ASSISTANT PHONE | M.SMITHE@CPSLEGAL.COM | | ADDRESS | ROOM A1 |

PERSONAL ADDRESSES

| CLIENT | PERSONAL MOBILE | EMPLOYER | PERSONAL MOBILE | WORK MOBILE |
|---|---|---|---|---|
| PETE PATTAVINA | (610) 555-9123 | CYBERDYNE SYSTEMS | (215) 555-3219 | (215) 555-9317 |
| SARAH CONNOR | (123) 456-7890 | CYBERDYNE SYSTEMS | (123) 456-7890 | (123) 621-9941 |
| LINDA CARTER | | | | (696) 219-7732 |
| BOB SLYDELL | | | | |

PERSONAL ADDRESSES

| DESCRIPTION | PHONE |
|---|---|
| CAPE COD HOME | |
| BOSTON PENTHOUSE | |

PRIMARY: CAPE COD HOME
MAILING: CAPE COD HOME

Fig. 3.9

| COMPANY | | | |
|---|---|---|---|
| EMPLOYER | CYBERDYNE SYSTEMS | | |
| WEB SITE | WWW.EXAMPLE.COM | | |
| MAIN PHONE | (888) 824-4477 | | |
| MAIN FAX | (484) 356-9444 | | |
| DETAILS | ROBOTICS SPECIALISTS | | |

| COMPANY LOCATIONS | | |
|---|---|---|
| LOCATION | PHONE | FAX |
| SILICON VALLEY | (132) 123-6548 | (132) 123-2654 |
| VALLEY FORGE | (215) 555-3216 | (215) 555-3217 |

| COMPANY EMPLOYEES | | | | | | |
|---|---|---|---|---|---|---|
| EMPLOYEE | WORK PHONE | WORK MOBILE | WORK EMAIL | DEPARTMENT | OCCUPATION | LOCATION |
| TOM BOSLEY | (215) 555-3197 | (215) 555-9966 | | CUSTOMER RELATIONS | ACCOUNT MANA | VALLEY FORGE |
| LINDA CARTER | | (123) 621-9941 | | INFORMATION SECURITY | CIO | SILICON VALLEY |
| OSCAR GOLDMAN | | | GOLDMAN@CYBER | | | SILICON VALLEY |
| PETE PATTAVINA | (215) 555-3219 | (215) 555-9317 | PPATTAVINA@CYBE | ADVANCED RESEARCH | ELECTRICAL ENG | VALLEY FORGE |
| PAM TEMPONI | (123) 456-7899 | (122) 222-2222 | TEMPONI@CYBERD | ACCOUNTING | ACCOUNTANT | SILICON VALLEY |

LOCATION FILTER

Fig. 4.1

BENEFIT PLAN DETAILS

BENEFIT PLAN: RETIREMENT INCOME SUPPLEMENT   PLAN TYPE: DEFERRAL   EMPLOYEE LEVEL: VP AND ABOVE

BENEFITS
EMPLOYEES CAN DEFER UP TO 20% OF THEIR GROSS ANNUAL COMPENSATION: COMPENSATION=SALARY+ANNUAL INCENTIVE
PARTICIPANTS GET A GUARANTEED 4% GROWTH ON ALL DEFERRALS

AT RETIREMENT
DEFERRALS ARE GIVEN AS A LUMP SUM AT RETIREMENT.

AT EARLY RETIREMENT
EARLY RETIREMENT IS BEFORE AGE 65. FOR EVERY FULL MONTH BEFORE THEIR FULL RETIREMENT MONTH THEY ARE PENALIZED .1% ON THE GROWTH ONLY. RETIREMENT BEFORE AGE 55 FORFEITS ALL GROWTH.

AT TERMINATION
PARTICIPANTS RECEIVE ORIGINAL MONEY BACK AS A LUMP SUM AND FORFEIT ALL GROWTH.

AT DISABILITY
FOR EVERY FULL MONTH BEFORE AGE 65 THEY GET PENALIZED .05% OF GROWTH TO A MAXIMUM OF 5%. NO AGE RESTRICTIONS. PAYOUT OCCURS AS A LUMP SUM.

AT DEATH
SAME AS DISABILITY.

BENEFIT PLANS

| PLAN | TYPE | LEVEL |
|---|---|---|
| RETIREMENT INCOME SUPPLEMENT | DEFERRAL | VP AND ABOVE |
| STOCK INCENTIVE SUPPLEMENT | RESTRICTED STOCK | DIRECTORS AND ABOVE |

SELECT A BENEFIT PLAN FROM THE LIST TO VIEW AND EDIT ITS DETAILS.

Fig. 4.2

| JOURNALS | | | |
|---|---|---|---|
| | DATE | CREATED BY | SUBJECT |
| | 03/27/2007 | AARON.DEMO | MEETING WITH HR REGARDING SARAH'S BENEFITS |
| | 02/02/2007 | WAYNE.DEMO | DISCUSSION REGARDING DISABILITY BENEFITS AT THE VP L |

NO JOURNAL SELECTED

SELECT A JOURNAL FROM THE GRID ON THE LEFT TO SEE ITS DETAILS.

WOULD YOU LIKE TO DO SOMETHING ELSE?

⊕ CREATE A NEW JOURNAL

✎ EDIT JOURNAL CATEGORIES

FILTER JOURNALS

CREATED BY ▷

EVENT ▷

CATEGORY ▷

OCCURRED AFTER

OCCURRED BEFORE

▷ APPLY THIS FILTER

☒ CLEAR THIS FILTER

Fig. 4.3

| HOME | VANGUARD S&P 500 | | | LOGOUT |
|---|---|---|---|---|

| INVESTMENT | RESEARCH | OWNERS | COMMISSIONS |
|---|---|---|---|

INVESTMENT [SAVE]

| INVESTMENT | VANGUARD S&P 500 |
|---|---|
| INVESTMENT TYPE | MANAGED ACCOUNT ▷ |
| STATUS | CURRENTLY RECOMMENDING ▷ |
| WEB SITE | WWW.VANGUARD.COM |
| TOTAL INVESTED | 1 |

COMPARABLE INVESTMENTS [ADD] [REMOVE]

| INVESTMENT | TYPE | STATUS |
|---|---|---|
| FIDELITY S+P 500 | MANAGED ACCOUNT | NOT RECOMMENDED |
| NATIONWIDE S+P 500 | MANAGED ACCOUNT | PREVIOUSLY RECOMMENDED |
| | | |
| | | |

INVESTMENT ALLOCATION

| LARGE GROWTH | | SMALL GROWTH | | INTL DEBT | | EMRG DEBT | | MONEY MKT | |
|---|---|---|---|---|---|---|---|---|---|
| LARGE BLEND | | SMALL BLEND | 83 | BALANCED | | HIGH YIELD | | REAL ESTATE | |
| LARGE VALUE | | SMALL VALUE | | WORLD | | MUNICIPALS | | COMMODITIES | 1 |
| MID GROWTH | | INTL EQ GROWTH | | EMRG EQ GROWTH | 16 | LOANS | | NATURAL RESOURCES | |
| MID BLEND | | INTL EQ BLEND | | EMRG EQ BLEND | | FEDERAL DEBT | | CASH | |
| MID VALUE | | INTL EQ VALUE | | EMRG EQ VALUE | | DEBT | | UNCLASSIFIED | 0 |

Fig. 5.1

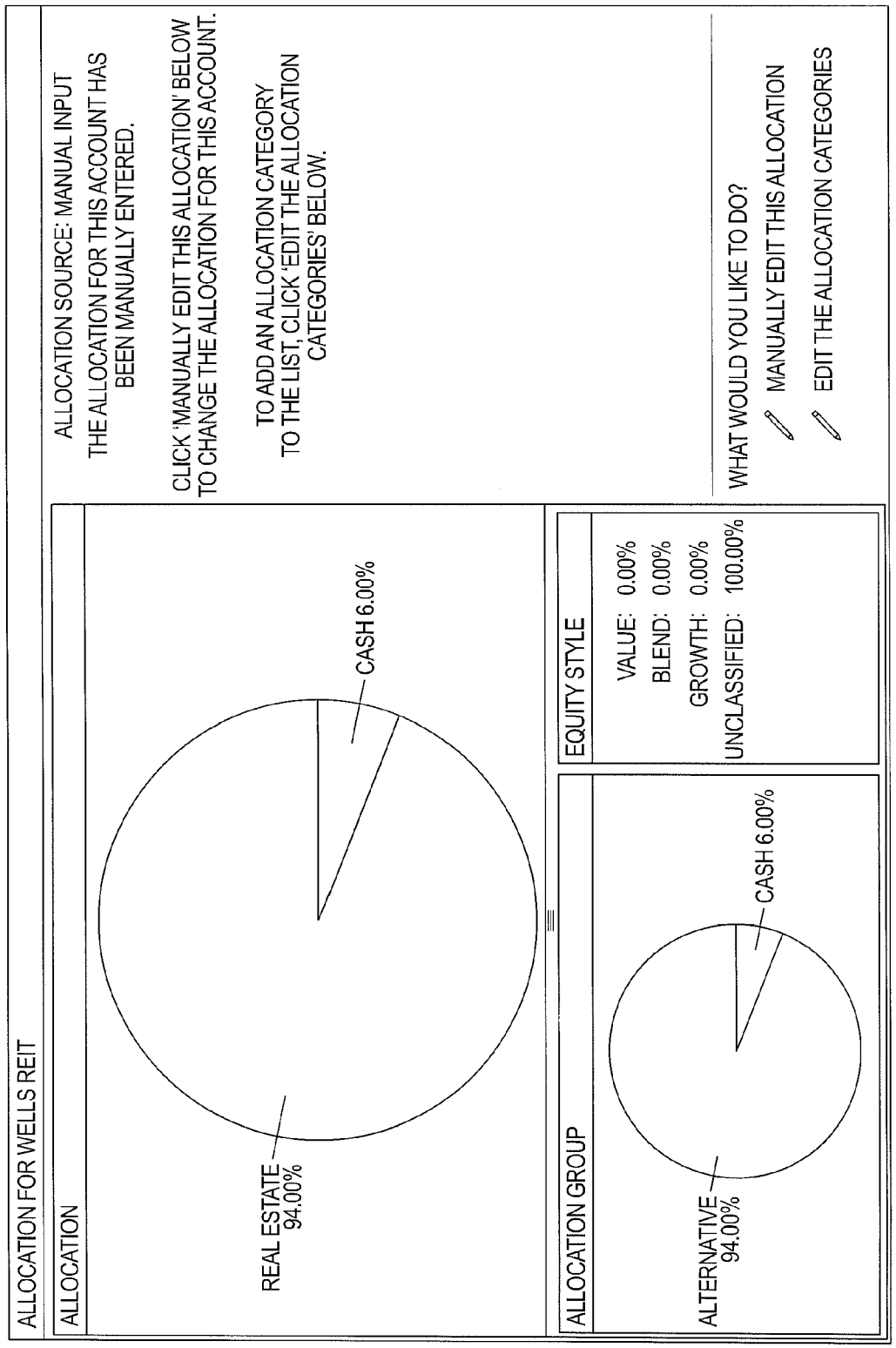
Fig. 5.2

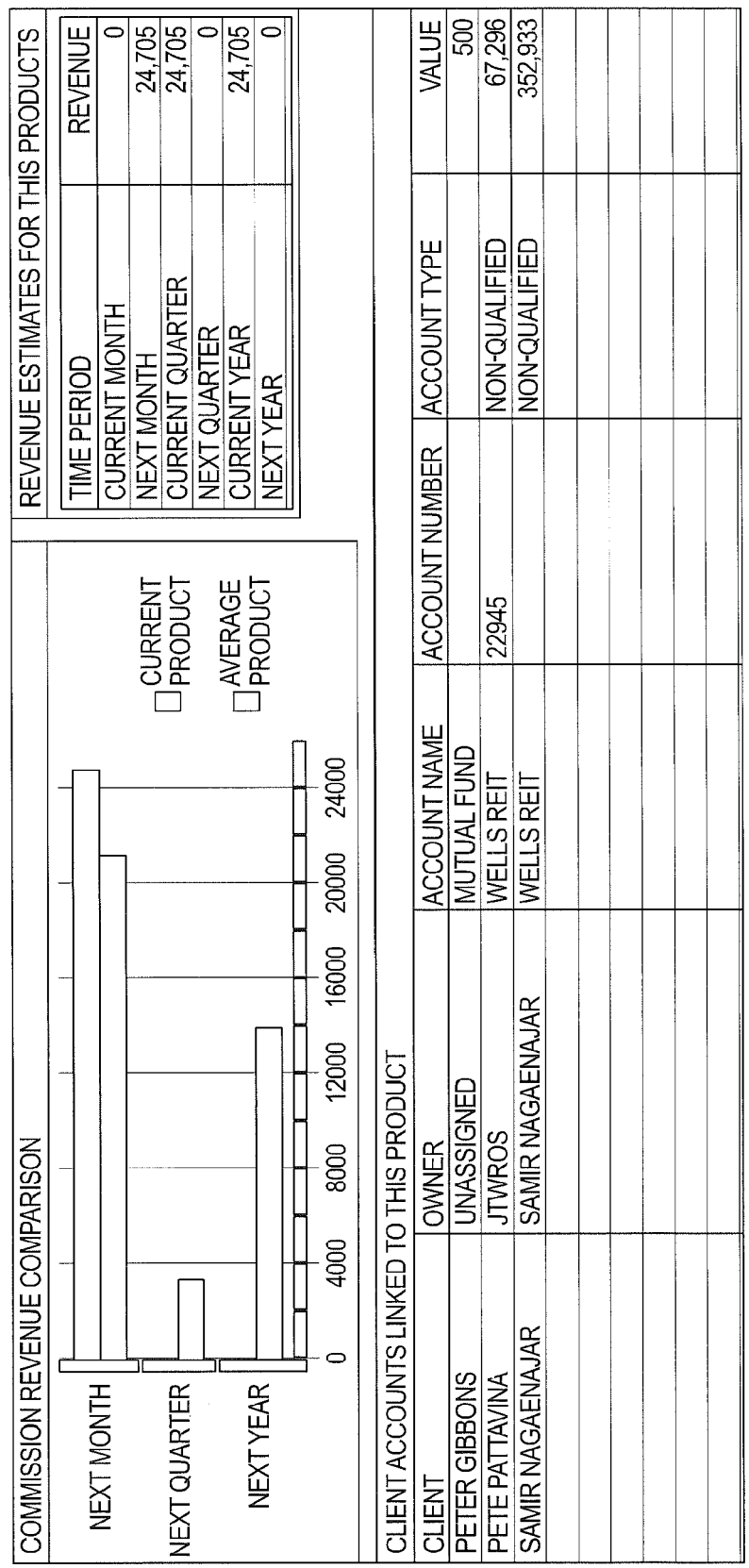
Fig. 5.3

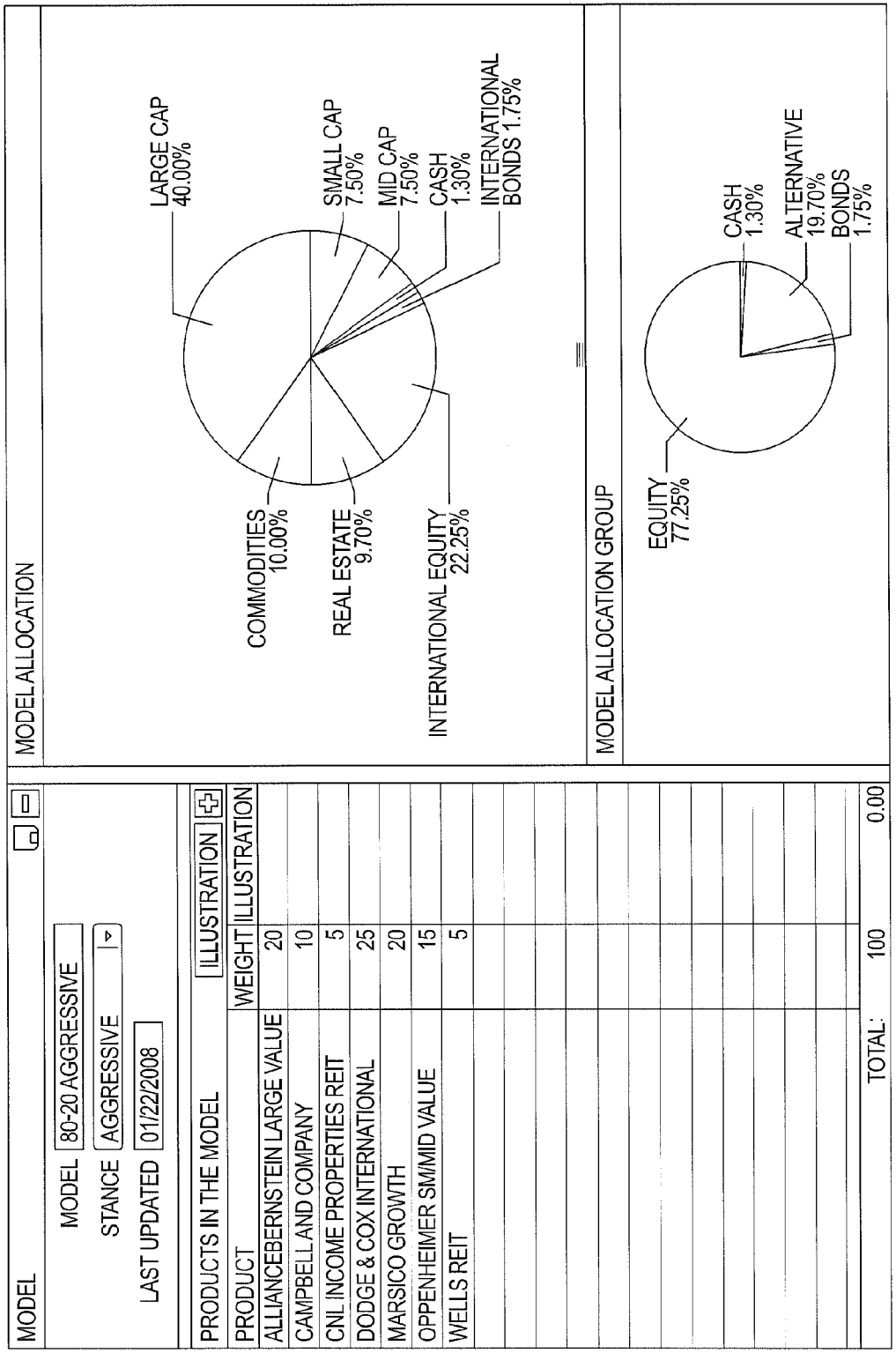
Fig. 6.1

| HOME | OVERVIEW | | | | | | | |
|------|----------|--|--|--|--|--|--|--|
| | MY BUSINESS | PEOPLE | COMPANIES | INVESTMENTS | MODELS | ADMINISTRATION | REPORTING | FILING | LOGOUT |

GRENDEL USERS

| USER | LOGIN ID | LEVEL |
|------|----------|-------|
| ROGIER DOEKES | ROGIER.DEMO | ADVISOR |
| AARON GUIDOMONY | AARON.DEMO | ADVISOR |
| JOHN GUIDOTTI | JOHN.DEMO | ADVISOR |
| WAYNE GUIDOTTI | WAYNE.DEMO | ADVISOR |
| SAMUEL ADAMS | SAMUEL.DEMO | ADVISOR |

SAVE

SELECT A USER FROM THE LEFT TO VIEW AND EDIT THEIR DETAILS AND PERMISSIONS.

CLIENT USERS

YOU ARE ALLOTTED A SPECIFIC NUMBER OF AVAILABLE CLIENT USERS. YOU CAN INCREASE THE NUMBER AT ANY TIME. TO CONTROL INDIVIDUAL CLIENT'S LOGIN PERMISSIONS, GO TO THE CLIENT AND CLICK 'ADMINISTRATION'.

CURRENT CLIENT USERS
TOTAL CLIENT USERS ALLOWED
REMAINING CLIENT USERS AVAILABLE

Fig. 7.1

| REPORTS | |
|---|---|
| AVAILABLE REPORTS | SELECTED REPORT: CONTACT INFORMATION (BY AGE) |
| ASSETS UNDER MANAGEMENT<br>BALANCE SHEET (ACCOUNTING)<br>BALANCE SHEET (FAMILY)<br>BALANCE SHEET (OUTSIDE OF ESTATE)<br>BILLING SUMMARY<br>COMPANY BENEFIT PLANS<br>COMPANY EMPLOYEES<br>CONTACT INFORMATION (ALPHABETICAL)<br>CONTACT INFORMATION (BY AGE)<br>CONTACT INFORMATION (BY BIRTHDAY)<br>CONTACT INFORMATION (BY EMPLOYER)<br>CONTACT INFORMATION (BY GRADE)<br>CONTACT INFORMATION (BY STATE) | REPORT DESCRIPTION: AN ALPHABETICAL LIST OF PEOPLE WITHIN A SPECIFIC AGE RANGE. PHONE NUMBERS AND ADDRESSES ARE INCLUDED AS WELL.<br><br>                                                                     <br>PEOPLE TYPE     NO SELECTIONS<br>AGE RANGE     FROM 18 TO 65<br>AGE AS OF     02/11/2008<br><br>SPECIFY WHAT YOU WISH TO SEE ON THE REPORT BY SELECTING SPECIFIC DETAILS FROM THE LIST TO THE RIGHT.<br><br>WHAT WOULD YOU LIKE TO DO?<br><br>🖶 PRINT THIS REPORT<br>[ADOBE (.PDF) ▷] |

Fig. 8.1

FILE UPLOAD

ITEMS NOT YET TAGGED

| FILE | UPLOADED | DOCUMENT |
|---|---|---|
| REIT RECOMMENDATIONS.PDF | 10/18/2007 | 10/18/2007 |

FILE OVERVIEW

TOTAL SPACE  3.000 GB
NOT FILED    0.000 GB
FILED        .010 GB
TOTAL USED   .010 GB
AVAILABLE SPACE  2.990 GB

WHAT WOULD YOU LIKE TO DO?

⊞ ADD FILES TO GRENDEL
✎ EDIT FILE DETAILS
🗑 SELECT FILES TO TAG

Fig. 9.1A

FILE UPLOAD

ITEMS NOT YET TAGGED

| FILE | UPLOADED | DOCUMENT |
|---|---|---|
| REIT RECOMMENDATIONS.PDF | 10/18/2007 | 10/18/2007 |

FILE EDITING STUFF

FILE NAME* REIT RECOMMENDATIONS.PDF
FILE AUTHOR AARON GUIDOTTI
UPLOADED ON 10/18/2007
DOCUMENT DATE* 10/18/2007
DETAILS THIS WAS A DOCUMENT THAT EXPLAINS WHY WE THINK THEY SHOULD BE INVESTING IN THIS REIT

FILE CABINET PEOPLE
CABINET FOLDER PETE PATTAVINA

WHAT WOULD YOU LIKE TO DO?

- DAVE CHANGES
- DELETE THIS FILE
- VIEW THIS FILE
- RETURN TO FILING OVERVIEW

Fig. 9.1B

FILE TAGGING

FILES BEING FILED

THESE ARE THE FILES YOU ARE CURRENTLY ASSIGNING TAGS TO.

| FILE |
|---|
| REIT RECOMMENDATIONS.PDF |

ACCOUNTS | TAG GROUPS

AVAILABLE TAGS

| TAG |
|---|
| 🔒 ACCOUNT (ADMIN) |
| 🔒 ACCOUNT (AGREEMENT) |
| 🔒 ACCOUNT (CHECK) |
| 🔒 ACCOUNT (CONFIRMATION) |
| 🔒 ACCOUNT (ORDER TICKET) |
| 🔒 ACCOUNT (STATEMENT) |
| ACCOUNT (NON-ACCOUNT) |
| BENEFICIARIES |
| COMPLAINT |
| 🔒 CORRESPONDENCE EMAIL |
| 🔒 CORRESPONDENCE EMAIL ATTACHMENT |
| 🔒 CORRESPONDENCE IN |
| 🔒 CORRESPONDENCE INSTANT MESSAGE |
| 🔒 CORRESPONDENCE INTERNAL |
| 🔒 CORRESPONDENCE MASS MAILING |
| DEFERRALS |

ASSIGNED ACCOUNTS

| | ACCOUNT | ACCOUNT NUMBER |
|---|---|---|
| A | CNL REIT | |
| A | SOVEREIGN BANK | 8271032135 |

ASSIGNED TAGS

| | TAG |
|---|---|
| 🔒 | CORRESPONDENCE OUT |
| | RECOMMENDATION |

Fig. 9.1.1

RETENTION PERIODS REPRESENT THE AMOUNT OF TIME YOU MUST KEEP A FILE AFTER A PARTICULAR EVENT. BY ASSIGNING PERIODS TO SPECIFIC FILE TAGS, YOU CREATE RETENTION REQUIREMENTS. WHEN YOU FILE A DOCUMENT THAT CONTAINS ANY OF THESE TAGS GRENDEL WILL AUTOMATICALLY ASSIGN THE RETENTION PERIODS TO THOSE FILES.

RETENTION PERIODS

| YEARS | MONTHS | AFTER |
|---|---|---|
| 6 | 0 | ACCOUNT CLOSED |
| 3 | 0 | DOCUMENT DATE |
| 6 | 0 | DOCUMENT DATE |

RETENTION PERIOD ASSIGNMENT

| UNASSIGNED TAGS | | ASSIGNED TAGS | RETENTION PERIOD |
|---|---|---|---|
| ACCOUNTING | | ACCOUNT (ADMIN) | 6 YR + ACCOUNT CLOSED |
| ADVERTISING | | ACCOUNT (AGREEMENT) | 6 YR + ACCOUNT CLOSED |
| AGREEMENT (NON-ACCOUNT) | | ACCOUNT (CHECK) | 3 YR + DOCUMENT DATE |
| AUDIT | | ACCOUNT (CONFIRMATION) | 3 YR + DOCUMENT DATE |
| BENEFICIARIES | | ACCOUNT (ORDER TICKET) | 3 YR + DOCUMENT DATE |

Fig. 9.2

FILE SEARCH

FILING TREE

- ▽ 📁 PETE PATTAVINA
  - △ ☐ ACCOUNT (ADMIN)
  - ▽ 📁 ACCOUNTS
    - ▽ 📁 ASSETS
      - △ ☐ AXA ANNUITY
      - △ ☐ IRA ROLLOVER
      - △ ☐ STEBEN FUTURES FUND A
      - ▽ 📁 WELLS REIT
        - △ ☐ ACCOUNT (ADMIN)
        - △ ☐ CORRESPONDENCE OUT
        - ▽ 📁 RECOMMENDATION
          - ☐ REIT RECOMMENDATIONS.PDF
    - △ ☐ CORRESPONDENCE IN
    - △ ☐ CORRESPONDENCE OUT
    - △ ☐ ESTATE
    - △ ☐ INCOME (PENSION)
    - △ ☐ INVOICE
    - △ ☐ PERSONAL
    - ▽ 📁 RECOMMENDATION
      - ☐ CAST FLOW ANALYSIS 2005.PDF
      - ☐ CAST FLOW ANALYSIS 2007.PDF

SEARCH RESULTS - 10 FILES FOUND

| FILE | UPLOADED ON | DOCUMENT DATE |
|---|---|---|
| CASH FLOW ANALYSIS 2005.PDF | 10/18/2007 | 06/01/2005 |
| CASH FLOW ANALYSIS 2007.PDF | 10/18/2007 | 05/18/2007 |
| REBALANCING RECOMMENDATIONS 2005.PDF | 10/18/2007 | 06/01/2005 |
| REBALANCING RECOMMENDATIONS 2006.PDF | 10/18/2007 | 06/01/2006 |
| 🔒 REIT RECOMMENDATIONS.PDF | 10/18/2007 | 09/24/2006 |
| ROLLOVER RECOMMENDATIONS.PDF | 10/18/2007 | 04/10/2006 |

FILE DETAILS FOR FILE: 000-002-762

VIEW RETENTION PERIODS — ALL DETAILS FOR THIS FILE CAN BE FOUND HERE. YOU CAN VIEW RETENTION PERIODS AND EDIT THE EVENT DATES BY CLICKING 'VIEW RETENTION PERIODS'. CLICKING 'UN-FILE' LAUNCHES THE FILING WIZARD AND ERASES ALL INFORMATION ABOUT THIS FILE EXCEPT FOR THE FILING HISTORY AND MRD.

| FILE NAME | REIT RECOMMENDATIONS.PDF | | MRD | 09/24/2009 |
|---|---|---|---|---|
| CABINET | PEOPLE | | UPLOADED ON | 10/18/2007 |
| FILE AUTHOR | | | DOCUMENT DATE | 09/24/2006 |
| DETAILS | | | | |

FILING HISTORY

| FILE DATE | | MRD |
|---|---|---|
| 10/18/2007 | | 09/24/2009 |

Fig. 9.3

TAG DETAILS

TAG* ACCOUNT (CHECK)
RETENTION 3 YR+ DOCUMENT DATE
STATUS NOT USED
TYPE SYSTEM TAG

FILING CABINETS

☑ PEOPLE
☐ COMPANIES
☐ PRODUCTS
☐ MY BUSINESS
☑ GROUPED BY DATE

TAG GROUP

CREATE AND EDIT TAG GROUPS BY DRAGGING AND DROPPING TAGS FROM THE 'FILE TAG' LIST TO THE 'TAG GROUP' LIST. YOU CAN ALSO DRAG FILES BACK IF YOU NO LONGER WANT THEM INCLUDED IN THE GROUP.

TAG GROUP * U4

TAG GROUP ASSIGNMENT

| AVAILABLE | ASSIGNED |
|---|---|
| ACCOUNT (ADMIN) | COMPLIANCE |
| ACCOUNT (AGREEMENT) | POLICIES |
| ACCOUNT (CHECK) | REGULATORY |
| ACCOUNT (CONFIRMATION) | |
| ACCOUNT (ORDER TICKET) | |
| ACCOUNT (STATEMENT) | |
| ACCOUNTING | |
| ADVERTISING | |
| AGREEMENT (NON-ACCOUNT) | |
| AUDIT | |
| BENEFICIARIES | |

FILE TAGS — RESET SYSTEM TAGS

THESE TAGS INCLUDE ALL SYSTEM TAGS AND ANY CUSTOM TAGS YOU HAVE CREATED. THIS LIST ALSO SHOWS ANY RETENTION PERIOD ASSIGNED AS WELL AS WHICH FILING CABINETS EACH TAG MAY BE FOUND IN. YOU CAN EDIT A TAG BY SELECTING IT. CLICK 'NEW' TO CREATE A CUSTOM TAG.

| TAG | RETENTION PERIOD | PE | C | PR | B | G |
|---|---|---|---|---|---|---|
| ACCOUNT (ADMIN) | 6 YR+ ACCOUNT CLOSED | 👤 | | | | ▦ |
| ACCOUNT (AGREEMENT) | 6 YR+ ACCOUNT CLOSED | 👤 | | | | ▦ |
| ACCOUNT (CHECK) | 3 YR+ DOCUMENT DATE | 👤 | | | | ▦ |
| ACCOUNT (CONFIRMATION) | 3 YR+ DOCUMENT DATE | 👤 | | | | ▦ |
| ACCOUNT (ORDER TICKET) | 3 YR+ DOCUMENT DATE | 👤 | | | | ▦ |
| ACCOUNT (STATEMENT) | 3 YR+ DOCUMENT DATE | 👤 | | | | ▦ |
| ACCOUNTING | | | | | | |
| ADVERTISING | | | | | | |

Fig. 9.4

FILE LOCATION SELECTION

FILING CABINET SELECTION

CABINET [ ▸ ]

FOLDERS

SELECT A FILING CABINET ABOVE.

ITEMS NOT YET FILED

| FOLDER | FOLDER | UPLOADED | DOCUMENT |
|---|---|---|---|
| ED SCHRYVER | 2005 05 BLOOMBERG.PDF | 08/07/2007 | 08/07/2007 |
| PETE PATTAVINA | REIT RECOMMENDATIONS.PDF | 10/18/2007 | 10/18/2007 |
| SARAH CONNOR | SALES PIECE 1.DOC | 08/06/2007 | 08/06/2007 |
| WELLS REIT | REPORT SETUP.DOC | 05/04/2007 | 05/04/2007 |
| WELLS REIT | AGGREGATION AGREEMENT EMAIL.DOC | 05/04/2007 | 05/04/2007 |
| KIKI BEREAU | FEE EXPLANATION.PDF | 02/27/2007 | 02/27/2007 |

Fig. 9.5

| GRENDEL - SUPERVISOR HOME | | OPEN AUDITS | | |
|---|---|---|---|---|
| CONDUCT AN AUDIT | | STARTED | AUDIT DESCRIPTION | ADVISOR GROUP |
| THIS ALLOWS YOU TO CONDUCT AN AUDIT OF AN ADVISOR GROUP WHERE YOU CAN CREATE 'AUDIT ACTION ITEMS'. GRENDEL WILL AUTOMATICALLY CREATE AN 'AUDIT LOG' WHICH TRACKS VARIOUS INFORMATION ABOUT YOUR AUDIT. | | 11/02/2007 | ANNUAL REVIEW: THIS AUDIT IS TO SAT | MONEY MAKERS, INC. |
| ⚲ SELECT AN ADVISOR GROUP TO CONDUCT AN AUDIT ON | | | | |
| OVERSEE AN ADVISOR GROUP | | | | |
| THIS ALLOWS YOU TO OVERSEE CLIENT INFORMATION AND FILES FOR A PARTICULAR ADVISOR GROUP. GRENDEL DOES NOT TRACK YOUR ACTIONS AND YOU CANNOT CREATE 'AUDIT ACTION ITEMS'. | | | | |
| ⚲ SELECT AN ADVISOR GROUP TO OVERSEE | | | | |
| FIND FILES | | | | |
| FIND FILES MEETING CERTAIN CRITERIA THAT YOU DEFINE. THESE SEARCHES CAN INCLUDE MULTIPLE ADVISOR GROUPS. | | | | |
| 🔍 FIND FILES | | | | |
| SETTINGS | | | | |
| VIEW AND EDIT SETTINGS FOR YOU AS A SUPERVISOR AS WELL AS FOR THE FIRM'S OVERALL POLICIES. | | | | |
| ⊞ MANAGE YOU SETTINGS | | | | |

Fig. 10

GRENDEL - ADVISOR GROUP SELECTION

ADVISOR GROUPS | ADVISORS

QUICK SEARCH - TYPE HERE

CAPITAL INVESTMENT SERVICES
GRENDEL DEMO SUPERVISOR
MONEY MAKERS, INC.

---

VERIFY THIS IS THE CORRECT ADVISOR GROUP USING THE INFORMATION BELOW. CLICK THE BUTTON TO THE RIGHT WHEN YOU ARE READY TO BEGIN THE AUDIT.

ALTERNATIVELY, YOU CAN LOAD AN EXISTING AUDIT FROM THE LIST BELOW.

[ BEGIN AUDIT ]

ADVISOR GROUP DETAILS: MONEY MAKERS, INC.

| GRENDEL USER | REP CODE |
|---|---|
| KELLY ADAMS | |
| QUALITY ASSURANCE | |
| JOEL BRUCKENSTEIN | |
| ROGIER DOEKES | |
| AARON GUIDOTTI | |
| JOHN GUIDOTTI | |
| WAYNE GUIDOTTI | |
| TONY LEAL | |
| SARAH MASTERS | |
| MATT NELSON | |
| WES SCHRYVER | |

ADDRESS
- COMPANY: MONEY MAKERS, INC.
- ADDRESS: 140 W GAY STREET
- CITY: WEST CHESTER
- STATE: PA    ZIP: 19380
- COUNTRY: USA

CONTACT
- PHONE: (484) 356-9444
- FAX: (484) 356-9445
- WEB SITE: WWW.BIGBRAINWORKS.COM

OPEN AUDITS: MONEY MAKERS, INC.

| STARTED | AUDIT DESCRIPTION | ADVISOR GROUP |
|---|---|---|
| 11/02/2007 | ANNUAL REVIEW: THIS AUDIT IS TO SATISFY TH | MONEY MAKERS, INC. |

Fig. 10.1

AUDIT OF: MONEY MAKERS, INC.

DATE STARTED: 11/02/2007

DESCRIPTION: ANNUAL REVIEW: THIS AUDIT IS TO SATISFY THE REQUIREMENT OF AN ANNUAL REVIEW OF ALL RIA'S. WE ANNOUNCED OUR VISIT TWO WEEKS PRIOR TO COMMENCING THE AUDIT.

REASON: ANNUAL INTERNAL AUDIT BY ROYAL

REQUESTED BY: ROYAL COMPLAINCE DEPARTMENT

| DATE | DESCRIPTION |
|---|---|
| 11/02/2007 | AUTOTRACK: AUDIT FOR 'MONEY MAKERS, INC.' CREATED BY 'AARON GUIDOTTI' |
| 11/02/2007 | AUTOTRACK: CLIENT 'PETE PATTAVINA' LOADED BY 'AARON GUIDOTTI' |
| 11/02/2007 | AUTOTRACK: 'PETE PATTAVINA' FILES LOADED BY 'AARON GUIDOTTI' |

- CREATE AN ACTION ITEM
- AUDIT CLIENT INFO AND FILES
- AUDIT PRODUCT INFO AND FILES
- AUDIT BUSINESS FILES
- AUDIT FILES GROUPED BY DATE
- AUDIT FILES ON OTHER COMPANIES

NO ACTION SELECTED

SELECT AN ACTION FROM THE LIST ABOVE

Fig. 10.1.1

| AUDIT OF: MONEY MAKERS, INC. | |
|---|---|
| DATE STARTED: 11/02/2007 | |
| DESCRIPTION: ANNUAL REVIEW: THIS AUDIT IS TO SATISFY THE REQUIREMENT OF AN ANNUAL REVIEW OF ALL RIA'S. WE ANNOUNCED OUR VISIT TWO WEEKS PRIOR TO COMMENCING THE AUDIT. | ⊕ CREATE AN ACTION ITEM |
| | ▭ VIEW THIS CLIENT'S FILES |
| REASON: ANNUAL INTERNAL AUDIT BY ROYAL | ▭ VIEW THIS CLIENT'S JOURNALS |
| | ▭ VIEW THIS CLIENT'S ACCOUNTS |
| REQUESTED BY: ROYAL COMPLAINCE DEPARTMENT | ⋘ RETURN TO MAIN AUDIT PAGE |

| CLIENT OVERVIEW: PETER PATTAVINA AND DENISE SMITH | | DATE | DESCRIPTION |
|---|---|---|---|
| SELECTED CLIENT: PETER PATTAVINA AND DENISE SMITH | | 11/02/2007 | AUTOTRACK: CLIENT 'PETE PATTAVINA' LOADED BY 'AARON GUID |
| ALSO KNOWN AS: PETE AND DENISE PATTAVINA | | 11/02/2007 | AUTOTRACK: 'PETE PATTAVINA' FILES LOADED BY 'AARON GUIDO |
| NET WORTH: 3,507,459 | | 11/02/2007 | FILE ID 533 OPENED BY 'AARON GUIDOTTI' |
| AGGREGATION STATUS: NOT AGGREGATING | | | |
| KNOWN SINCE: 6/28/2005 | | | |
| CLIENT AGE: 57 | | | |
| CLIENT EMPLOYMENT: EMPLOYED | | | |
| CLIENT EMPLOYER: CYBERDYNE SYSTEMS | | | |
| CLIENT RETIREMENT: 12/31/2012 | | | |
| CO-CLIENT AGE: 54 | | | |
| CO-CLIENT EMPLOYMENT: EMPLOYED | | | |
| CO-CLIENT EMPLOYER: | | | |
| CO-CLIENT RETIREMENT: | | | |

Fig. 10.1.2

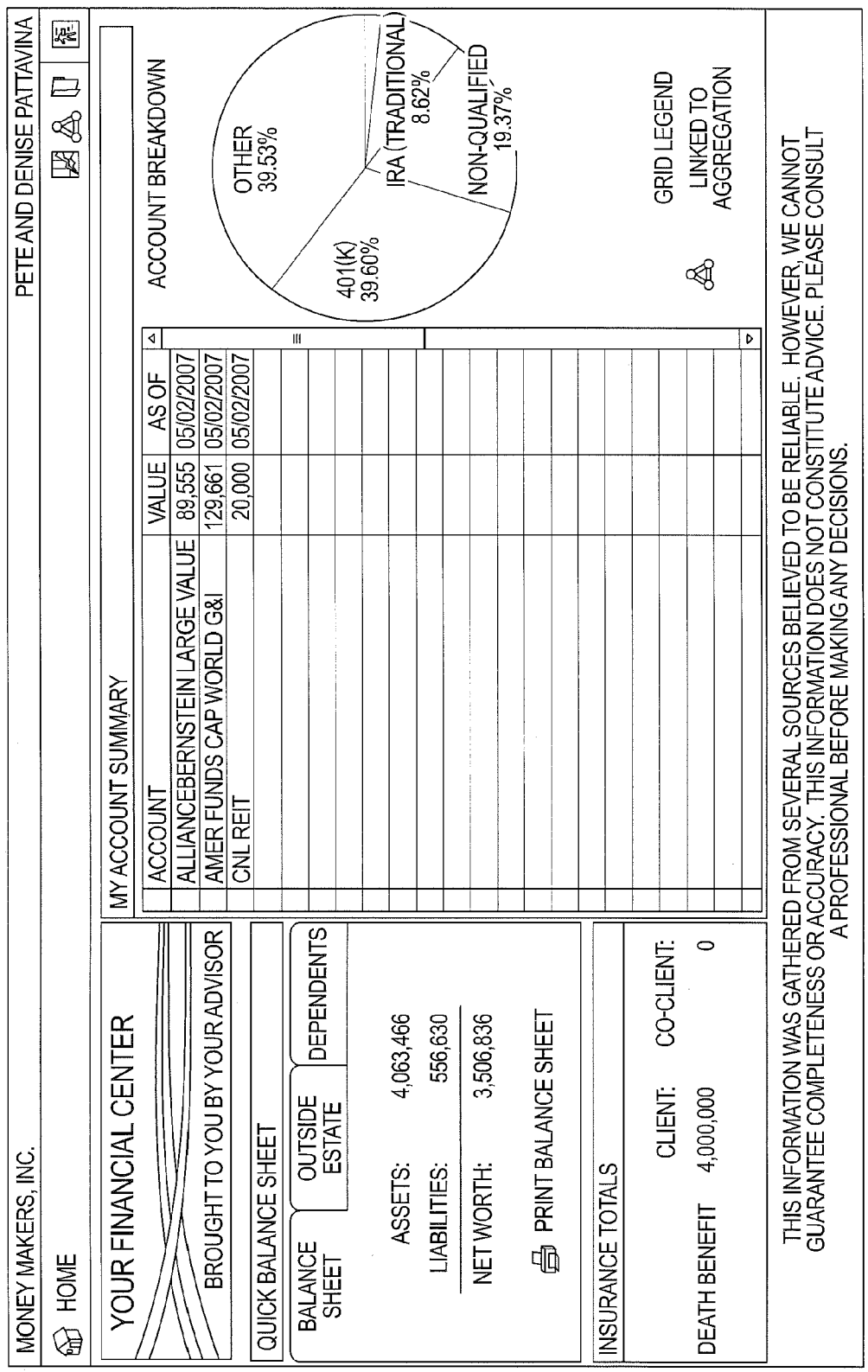
Fig. 11.1

MONEY MAKERS, INC.          PETE AND DENISE PATTAVINA

MY ACCOUNT: IRA ROLLOVER

ACCOUNT: IRA ROLLOVER
ACCOUNT #: 34210552
OWNER: PETE PATTAVINA
TYPE: IRA ROLLOVER
VALUE: 97,489.91
AS OF: 10/23/2007
BASIS: 1,000,000
AS OF: 10/17/2007

| HISTORY | BREAKDOWN | HOLDINGS | AGGREGATION |
|---|---|---|---|

| HOLDING | TICKER | PRICE | UNITS | BASIS | VALUE |
|---|---|---|---|---|---|
| DODGE & COX INTERNATIONAL FUND | DODFX | 40 | 259.8160 | 0 | 10,574 |
| EATON VANCE TAX MANAGED GLOBAL DIVERSIFIED INCOR | EXG | 16 | 637.0000 | 0 | 10,198 |
| MARSICO FOCUS FUND | MFOCX | 17 | 555.8900 | 0 | 9,772 |

🌐 VIEW WEB SITE

« BACK TO ALL ACCOUNTS

THIS INFORMATION WAS GATHERED FROM SEVERAL SOURCES BELIEVED TO BE RELIABLE. HOWEVER, WE CANNOT GUARANTEE COMPLETENESS OR ACCURACY. THIS INFORMATION DOES NOT CONSTITUTE ADVICE. PLEASE CONSULT A PROFESSIONAL BEFORE MAKING ANY DECISIONS.

Fig. 11.2

Fig. 11.3

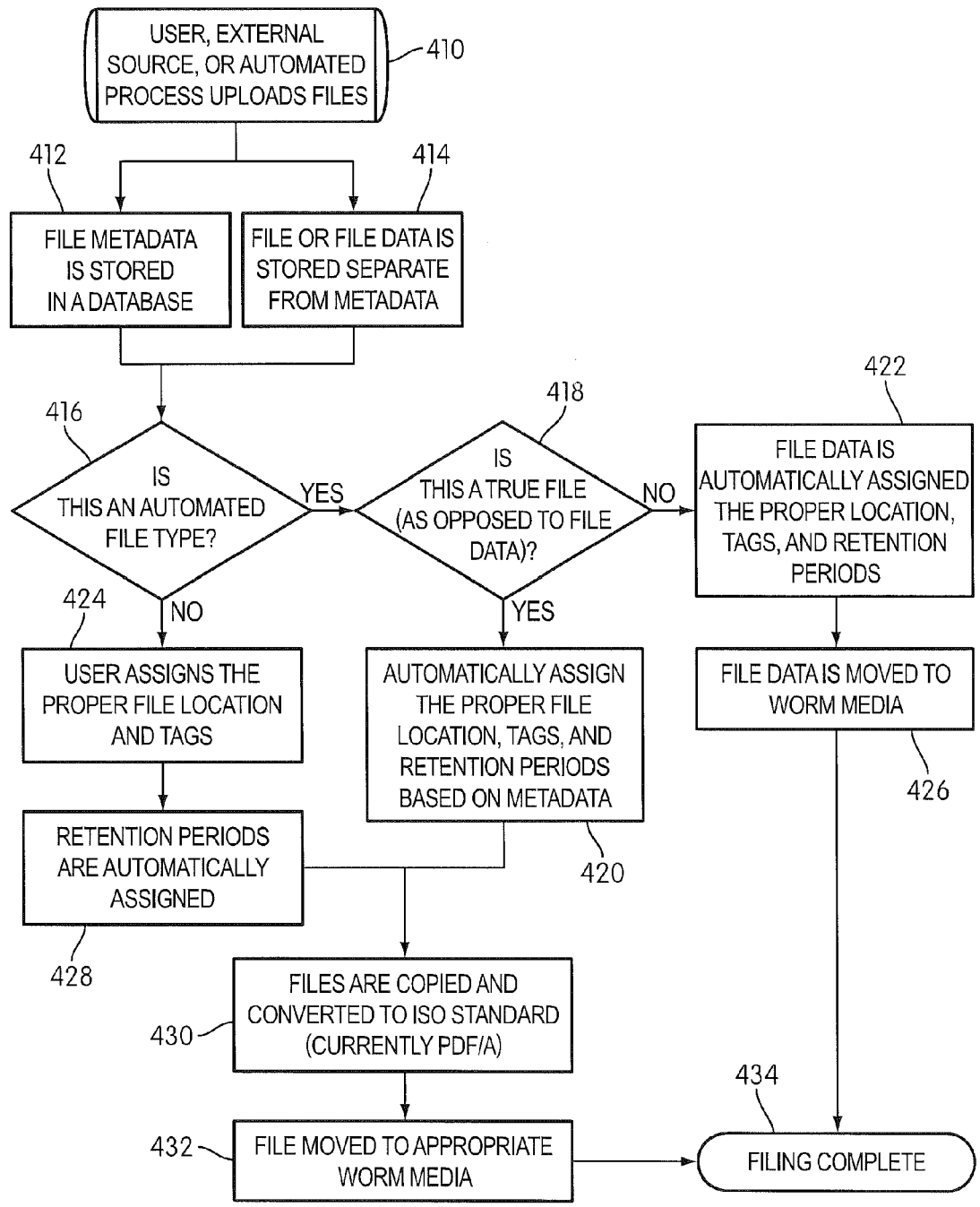
Fig. 13.1

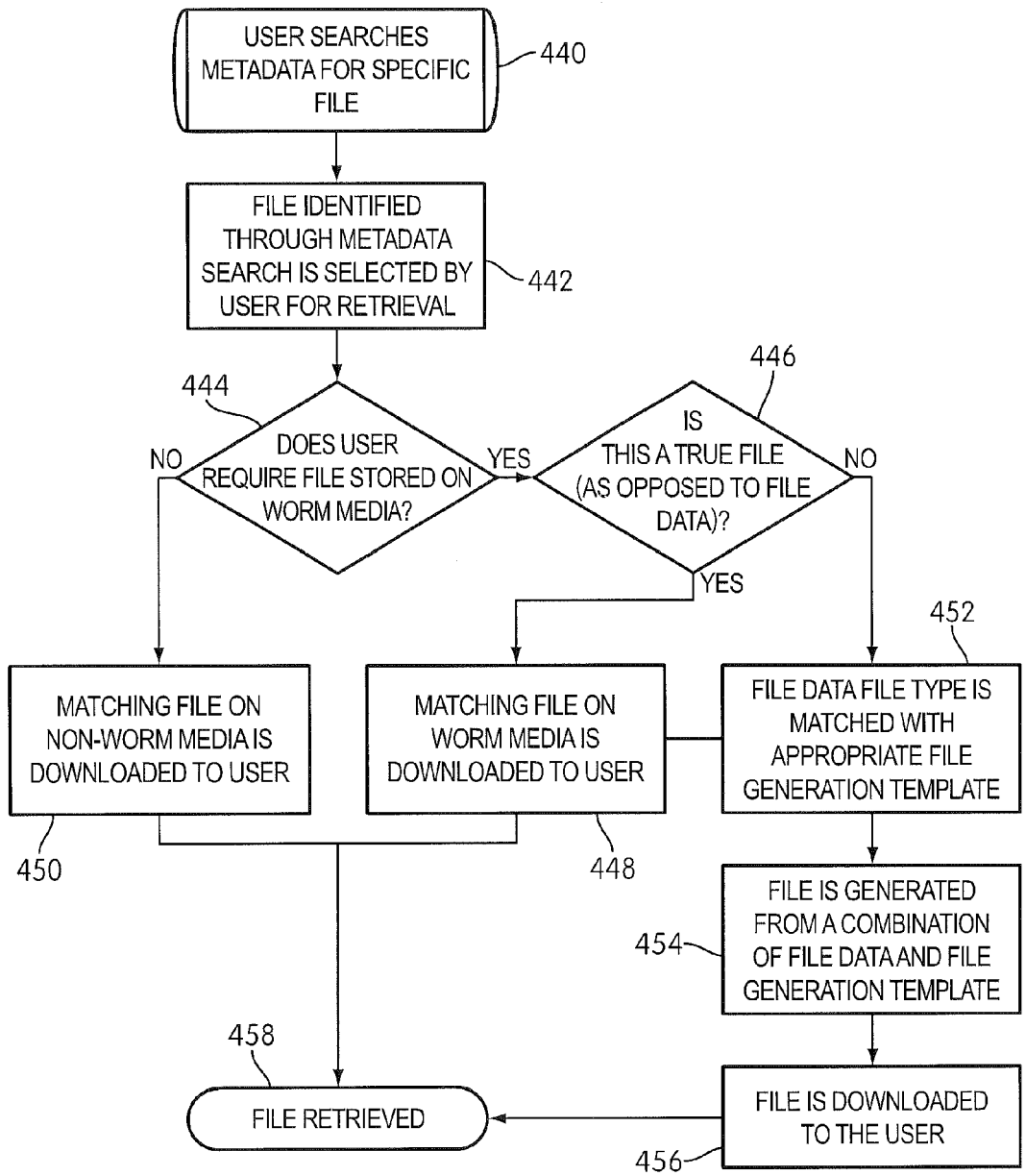
Fig. 13.2

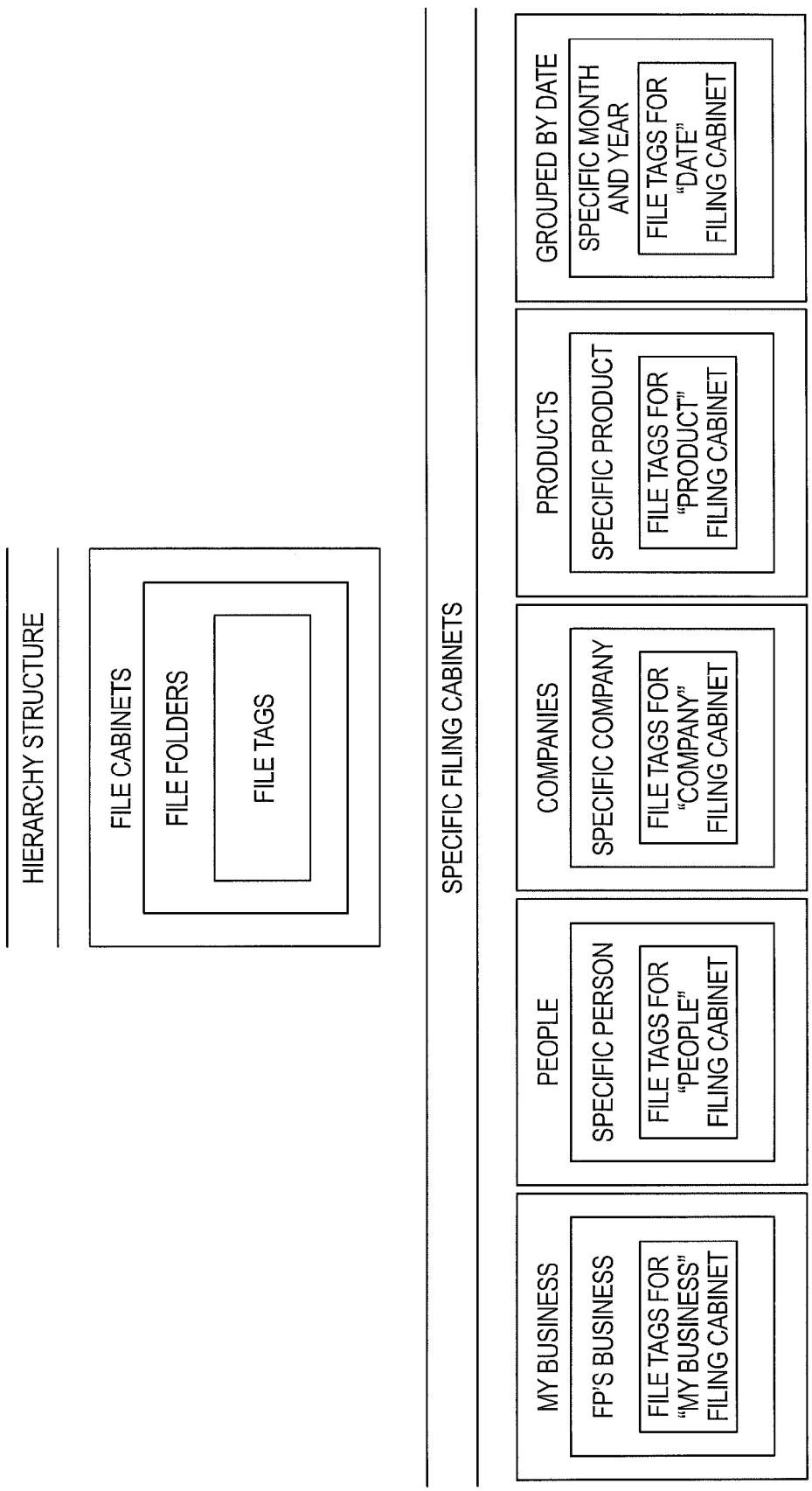
Fig. 13.3

INFORMATION, DOCUMENT, AND COMPLIANCE MANAGEMENT FOR FINANCIAL PROFESSIONALS, CLIENTS, AND SUPERVISORS

FIELD OF THE INVENTION

The present invention relates to a method for integrating and managing information, documents, and compliance for the management and supervision of a financial professional's practice, and more particularly, to methods for management of a financial professional's practice, clients, contacts, investment management, filing, compliance, and regulatory requirements by financial professionals, financial professional clients, and financial professional supervisors.

DESCRIPTION OF BACKGROUND ART

The continued emergence of a fully networked economy is inevitable due to: (1) computer software and hardware becoming increasingly powerful and less expensive; (2) communication and network technologies becoming increasingly powerful and less expensive; and (3) the proliferation of the Internet and other networking related technologies.

The use of computer software, hardware and networking technologies in the management of financial services has also expanded in recent years. In particular, financial service firms are continuing to integrate these technologies into their businesses in order to provide an automated approach for personal asset and wealth management and to improve their efficiency in providing financial advice and other services to their clients.

As a result of the advances in technologies and applications of these technologies to business tasks, a dramatically expanded use of electronic commerce (e-commerce) has also occurred. Entirely new paradigms for e-commerce have evolved or emerged from traditional non e-commerce businesses and business models. In particular, e-commerce through the Internet, is widely credited with introducing tremendous efficiencies in commercial transactions. This expanded use of the Internet has also dramatically altered the vendor/customer relationship.

For example, in the financial services industry, the ability of an organization to provide enhanced customer service through the use of advanced technology and e-commerce can be a valuable competitive advantage. Financial professionals may be hampered in their ability to service a client fully if they are only able to retrieve limited client and financial information due to limited integration of computer hardware, software, networking and e-commerce resources. Therefore, more efficient methods for managing assets and financial advising and more powerful support tools for wealth management and the management of the financial practitioner's business will require computer hardware/software platforms that overcome past limitations in what is now a highly technological financial arena.

SUMMARY OF THE INVENTION

The present invention is directed at overcoming the foregoing and other difficulties encountered in the background art. In particular, the present invention is a method and system for facilitating service and analysis of the needs of financial planning professionals and their clients as well as supervisors and regulatory agents responsible for overseeing financial professionals.

The embodiments of the present invention provide many aspects that are not believed to be supplied by the background art. For example, integrated calendar and scheduling functionality is not discussed in the art.

Additionally, integrated email functionality is not discussed in the art. An embodiment of the invention allows the users to access their email. Users have the ability to both send and receive email from the invention. Further, the invention automatically files all incoming and outgoing email in the appropriate location with the appropriate tags and the appropriate retention period. Sophisticated logic and intelligence rules are used to aid in the reduction and elimination of unwanted emails (e.g. unsolicited advertisements).

Further, an embodiment of the invention known as the "Timeline" is not discussed in the art. The timeline is a graphical representation of all events and actions that have occurred displayed in a chronological fashion. Users have the ability to define the length and specific dates within the timeline. For example, the timeline may be used for a client to show things such as journals, account transactions, calendar events, life events (e.g. retirement dates), personal and professional events, and other events that occur within the scope of the invention.

Embodiments of the present invention provide a financial professional or other end user ("FP") with computer screens or other electronic visual display or audio generating device that present information regarding the FP's business, clients, contacts, companies, investments, model portfolios, and electronic/digital filing.

Business information would specifically include, but not be limited to: compliance tracking and management (with regard to corporate or firm rules, federal and state statutes, or any other rule, law, or statute that the FP would be bound by); oversight of all tasks or projects as defined by the FP or the FP's staff; forecasting of income the FP's firm can expect to generate based on outstanding advisory fees, assets under management, commissions, and commission trails; pending investment recommendations made to clients; calendar functionality; email management and audit tracking and management (related to regulatory, internal, or other audits of the FP's practice).

Client information would specifically include, but not be limited to: personal and professional details; journaling capabilities (whereby the FP can manage and track notes and details of the event in which the note is regarding); oversight of all tasks or projects as defined by the FP or the FP's staff; advisory fee tracking; clients' advisor (other than the FP) relationship management; asset, insurance, liability, and cash flow tracking and management; investment check (written by or for the client) tracking; estate document and entity tracking and management; portfolio management, investment performance reporting, and asset under management tracking and management.

Contact information would specifically include, but not be limited to: personal and professional details; journaling capabilities; and professional relationships tracking and management. Company information would specifically include, but not be limited to: company locations; company employees and contacts; company benefit plan details; journaling capabilities; and investments managed by the company (for those companies that actually do manage investments).

Investment, insurance, and debt products ("PRODUCT") information would specifically include, but not be limited to: PRODUCT allocation; PRODUCT research tracking and management; PRODUCT comparison capabilities; PRODUCT owner tracking; PRODUCT history; PRODUCT transactions; PRODUCT performance reporting; and commissions and trails tracking and management.

Model Portfolio information would specifically include, but not be limited to: model portfolio creation and management; weighted asset allocation calculations; consolidation and calculation of allocation information; consolidation and calculation of equity style information; and client portfolio illustration.

Electronic filing would specifically include, but not be limited to: digital documents and files that may be uploaded by an end user, uploaded via an automated process, captured (e.g. email may be captured), or otherwise added to the system; the process and method by which files are converted to a standard format (e.g. PDF/A); the process and method of assigning specific identifiers to each file for identification and retrieval purposes as well as for proper retention; the capabilities to create and manage file retention periods and assignments; the process and method of storing the file in a manner acceptable to be considered compliant with statues, rules, and regulations (e.g. non-erasable and non-alterable on a WORM format); the process and method of storing files in a manner whereby the ability to destroy files after all appropriate retention periods have been satisfied without destroying files that have not satisfied their relative retention requirements is retained; and the ability to retrieve files. Further, the client as well as the FP's supervisors and regulatory agents responsible for oversight of the FP may be offered access to the same, similar or related data via a Web browser or other interface.

Further, the method and system of the present invention provides databases that are maintained and updated for access by a FP or other end users; generates reports; runs summaries and provides projections, analysis, and recommendations for advisement.

Furthermore, the method and system of the present invention provides financial services and analysis capabilities that allow an advisor to individually manage a multitude of separate and distinct customer accounts for a fraction of the cost of more expensive background art financial advising systems. Specifically, the method and system of the present invention takes a client's personal and business profile into account in comparing and selecting financial instruments (e.g., stocks, corporate and municipal bonds, mutual funds, certificates of deposit, government securities, money markets, etc.) for investment and wealth management.

In one aspect of the invention, a computer-based method for integrating and managing information, documents, and compliance comprises accessing client data wherein the client data comprises an associated account portfolio and a client profile; retrieving integrated data from a database wherein the integrated data is related to the client data and is compiled from at least one of a plurality of sources; analyzing the retrieved integrated data in accordance with the client profile; enriching the analyzed retrieved integrated data by graphically displaying at least one of performance data, accuracy data, pricing data, benchmark data and historical data associated with the associated account portfolio; communicating the analyzed retrieved integrated data between at least the client and at least an advisor to enable the client and the advisor to collaborate on the analyzed retrieved integrated data; and displaying the analyzed retrieved integrated data based on display specifications which comprise at least one of client defined display specifications and default display specifications.

In another aspect of the invention, a system for integrating and managing information, documents, and compliance comprises means for accessing client data wherein the client data comprises an associated account portfolio and a client profile; means for retrieving integrated data from a database wherein the integrated data is related to the client data and is compiled from at least one of a plurality of sources; means for analyzing the retrieved integrated data in accordance with the client profile; means for enriching the analyzed retrieved integrated data by graphically displaying at least one of performance data, accuracy data, pricing data, benchmark data and historical data associated with the associated account portfolio; means for communicating the analyzed retrieved integrated data between at least the client and at least an advisor to enable the client and the advisor to collaborate on the analyzed retrieved integrated data; and means for displaying the analyzed retrieved integrated data based on display specifications which comprise at least one of client defined display specifications and default display specifications.

In yet another aspect of the invention, an embodiment that is computer-implemented further comprises a computer-readable medium containing software code that, when executed by a computer, causes the computer to implement method for integrating and managing information, documents, and compliance among financial professionals, financial professional's clients, and financial professional's supervisors comprising: providing a user interface for allowing the graphical selection, display and representation of information and commands related to data associated with a financial professional's practice; accessing the data associated with the financial professional's practice; retrieving integrated data from one or multiple databases wherein the integrated data is related to the financial professional's practice data and is compiled from at least one of a plurality of sources; and analyzing the retrieved integrated data by applying at least one of a plurality of operational applications, wherein the plurality of operational applications comprises a filing application, an audit application, a compliance application, a management application and a portfolio application and wherein the selective application of at least one of the plurality of operational applications allows a user of the method to analyze the retrieved integrated data in a manner consistent with their personal style of information management.

BRIEF DESCRIPTION OF THE DRAWINGS

FIG. 1.0 is an exemplary screen shot of a HOME page and NAVIGATION in accordance with an embodiment of the invention.

FIG. 2.2 is an exemplary screen shot of a Business Projects Summary page in accordance with an embodiment of the invention.

FIG. 2.2.1 is an exemplary screen shot of a Project Detail page in accordance with an embodiment of the invention.

FIG. 2.2.2 is an exemplary screen shot of a Project Templates page in accordance with an embodiment of the invention.

FIG. 2.3 is an exemplary screen shot of a Business Income Forecasting page in accordance with an embodiment of the invention.

FIG. 2.3.1 is an exemplary screen shot of an Assets Under Management and Commission Schedules page in accordance with an embodiment of the invention.

FIG. 2.4 is an exemplary screen shot of a Pending Recommendations page in accordance with an embodiment of the invention.

FIG. 2.5 is an exemplary screen shot of a Compliance Overview page in accordance with an embodiment of the invention.

FIG. 3.1 is an exemplary screen shot of a Client Personal Information in accordance with an embodiment of the invention.

FIG. 3.2 is an exemplary screen shot of a Client Professional Information page in accordance with an embodiment of the invention.

FIG. 3.3A is an exemplary screen shot of a Client Journal (Overview) in accordance with an embodiment of the invention.

FIG. 3.3B is an exemplary screen shot of a Client Journal (Specific Journal View) page in accordance with an embodiment of the invention.

FIG. 3.3C is an exemplary screen shot of a Client Journal (Zoom View) page in accordance with an embodiment of the invention.

FIG. 3.4 is an exemplary screen shot of a Client Specific Projects page in accordance with an embodiment of the invention.

FIG. 3.5 is an exemplary screen shot of a Fees page in accordance with an embodiment of the invention.

FIG. 3.6 is an exemplary screen shot of a Client Advisors page in accordance with an embodiment of the invention.

FIG. 3.7 is an exemplary screen shot of a Client Administration page in accordance with an embodiment of the invention.

FIG. 3.7.1 is an exemplary screen shot of a Client Administration (Permissions View) in accordance with an embodiment of the invention.

FIG. 3.8A is an exemplary screen shot of a Client Wealth Overview (Current Allocation Detail) page in accordance with an embodiment of the invention.

FIG. 3.8B is an exemplary screen shot of a Client Wealth Overview (Group and Style Detail) page in accordance with an embodiment of the invention.

FIG. 3.8C is an exemplary screen shot of a Client Wealth Overview (Target Allocation Detail) page in accordance with an embodiment of the invention.

FIG. 3.8D is an exemplary screen shot of a Client Wealth Overview (Allocation Balance Detail) page in accordance with an embodiment of the invention.

FIG. 3.8.2 is an exemplary screen shot of a Client Asset Overview page in accordance with an embodiment of the invention.

FIG. 3.8.2.1 is an exemplary screen shot of a Client Asset Details page in accordance with an embodiment of the invention.

FIG. 3.8.2.2 is an exemplary screen shot of a Client Asset Allocation page in accordance with an embodiment of the invention.

FIG. 3.8.2.3 is an exemplary screen shot of a Client Asset Holdings and Grants page in accordance with an embodiment of the invention.

FIG. 3.8.2.4 is an exemplary screen shot of a Client Asset History page in accordance with an embodiment of the invention.

FIG. 3.8.3 is an exemplary screen shot of a Client Insurance Overview page in accordance with an embodiment of the invention.

FIG. 3.8.4 is an exemplary screen shot of a Client Investment Checks page in accordance with an embodiment of the invention.

FIG. 3.8.5 is an exemplary screen shot of a Client Liabilities page in accordance with an embodiment of the invention.

FIG. 3.8.6 is an exemplary screen shot of a Client Cash Flow page in accordance with an embodiment of the invention.

FIG. 3.8.7 is an exemplary screen shot of a Client Estate page in accordance with an embodiment of the invention.

FIG. 3.8.8 is an exemplary screen shot of a Client Assets Under Management (AUM) Overview page in accordance with an embodiment of the invention.

FIG. 3.8.9 is an exemplary screen shot of an Aggregation page in accordance with an embodiment of the invention.

FIG. 3.9 is an exemplary screen shot of a Contact page in accordance with an embodiment of the invention.

FIG. 4.1 is an exemplary screen shot of a Company Detail page in accordance with an embodiment of the invention.

FIG. 4.2 is an exemplary screen shot of a Company Benefit Plan Detail page in accordance with an embodiment of the invention.

FIG. 4.3 is an exemplary screen shot of a Company Journal page in accordance with an embodiment of the invention.

FIG. 5.1 is an exemplary screen shot of a Product Overview and Research page in accordance with an embodiment of the invention.

FIG. 5.2 is an exemplary screen shot of a Product Allocation page in accordance with an embodiment of the invention.

FIG. 5.3 is an exemplary screen shot of a Product Owners and Revenue page in accordance with an embodiment of the invention.

FIG. 6.1 is an exemplary screen shot of a Model Portfolio page in accordance with an embodiment of the invention.

FIG. 7.1 is an exemplary screen shot of an Administration page in accordance with an embodiment of the invention.

FIG. 8.1 is an exemplary screen shot of a Reports page in accordance with an embodiment of the invention.

FIG. 9.1A is an exemplary screen shot of a File Upload Center page in accordance with an embodiment of the invention.

FIG. 9.1B is an exemplary screen shot of a File Upload Center (Edit Detail View) page in accordance with an embodiment of the invention.

FIG. 9.1.1 is an exemplary screen shot of a Files Being Tagged page in accordance with an embodiment of the invention.

FIG. 9.2 is an exemplary screen shot of a File Retention Period page in accordance with an embodiment of the invention.

FIG. 9.3 is an exemplary screen shot of a File Search page in accordance with an embodiment of the invention.

FIG. 9.4 is an exemplary screen shot of a File Tags page in accordance with an embodiment of the invention.

FIG. 9.5 is an exemplary screen shot of a Files Not Yet Tagged page in accordance with an embodiment of the invention.

FIG. 10 is an exemplary screen shot of a Supervisor Home page in accordance with an embodiment of the invention.

FIG. 10.1 is an exemplary screen shot of a Supervisor Audit (Practice Selection) page in accordance with an embodiment of the invention.

FIG. 10.1.1 is an exemplary screen shot of a Supervisor Audit (Home) page in accordance with an embodiment of the invention.

FIG. 10.1.2 is an exemplary screen shot of a Supervisor Audit (Client Specific) page in accordance with an embodiment of the invention.

FIG. 11.1 is an exemplary screen shot of a Client Module (Home) page in accordance with an embodiment of the invention.

FIG. 11.2 is an exemplary screen shot of a Client Module (Account Detail) page in accordance with an embodiment of the invention.

FIG. 11.3 is an exemplary screen shot of a Client Module (Files) page in accordance with an embodiment of the invention.

FIG. 13.1 is an exemplary illustration of the Filing Process (Adding) in accordance with an embodiment of the invention.

FIG. 13.2 is an exemplary illustration of the Filing Process (Retrieving) in accordance with an embodiment of the invention.

FIG. 13.3 is an exemplary illustration of the File Location Structure in accordance with an embodiment of the invention.

DETAILED DESCRIPTION OF THE INVENTION

Figure 12:
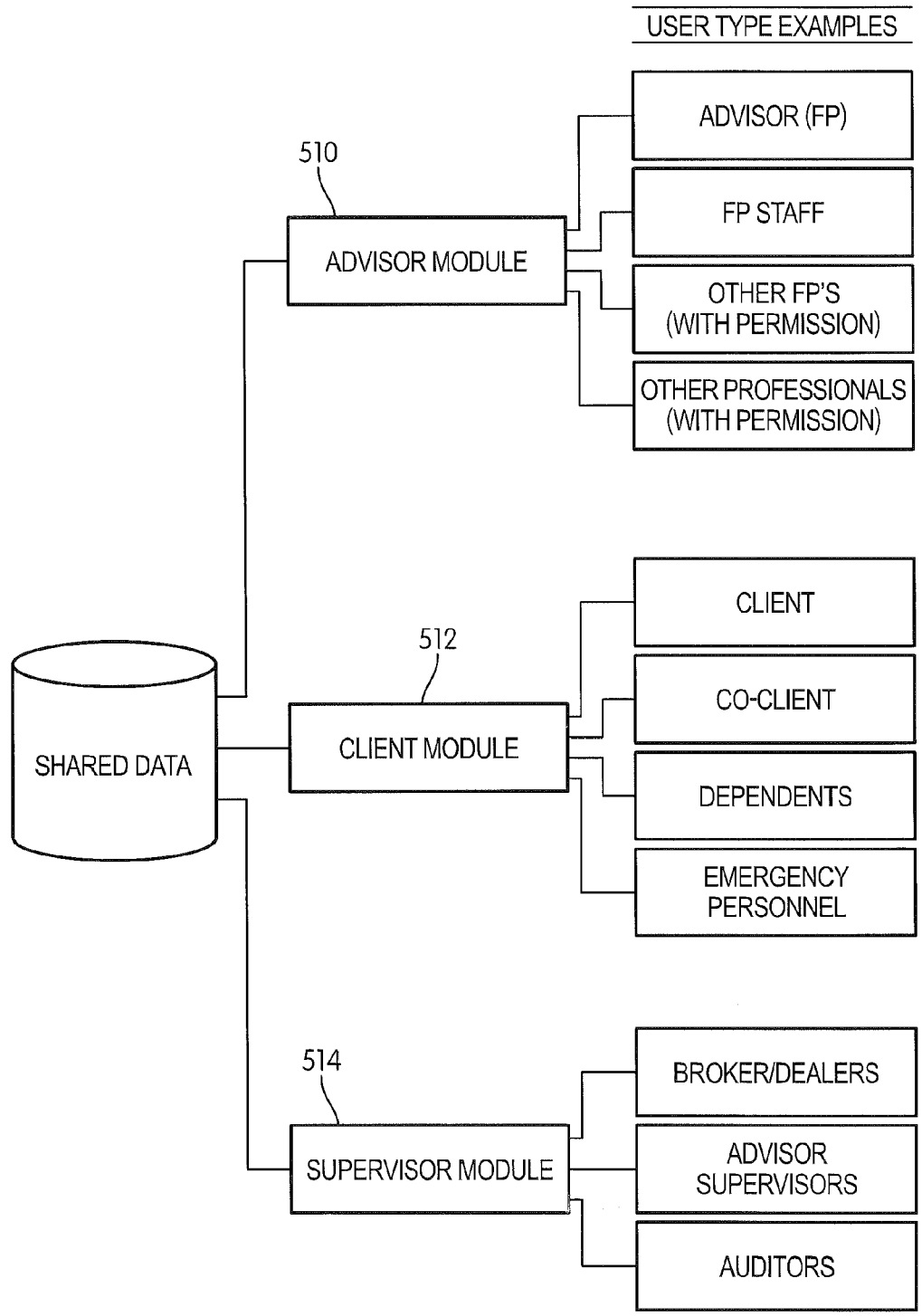
FIG. 12 is an exemplary illustration of non-limiting examples of the user types and their connection to the three modules within an embodiment of the invention.

The present invention provides a computer-based method and system for improved information management for FP's, FP clients, and FP supervisors. In particular, the method and system integrates various data and information management tools and databases as well as the underlying data and information that require management. Preferably, the present invention is implemented as a combination of software and hardware elements comprising an input device, display monitor, a graphical user interface (GUI), at least one communications device for connection to the internet and remote databases such as a modem, and at least one processing unit of a design adapted to perform the method of the invention.

According to an embodiment of the present invention, the invention comprises at least one integrated database that includes or interfaces with relational databases or other types of databases which utilize Sybase or other data storage or query formats, platforms or resources such as OLAP (On Line Analytical Processing), SQL (Standard Query Language); and include a storage area network (SAN). The databases of the present invention may be housed locally or remotely, for instance, in a secure, scalable facility. For security and reliability, redundancy may be employed in the integrated database.

The present invention includes a data repository and may host various other applications to provide a consolidated view of information and information management solutions regarding FPs, clients, and supervisors. In addition, the present invention allows the user to customize and analyze the information in a manner consistent with their personal style of information management. The elements that make up the present invention are further discussed in the following paragraphs.

FIG. 1.0 is an exemplary computer display screen shot of a HOME page in accordance with an embodiment of the invention. In particular, the HOME page view displays consolidated information gathered from various sources throughout the present invention as well as from outside sources. These consolidated views allow users to quickly access information likely to be currently relevant. As shown in FIG. 1.0, the NAVIGATION HEADINGS 110-128 allow the user to select different pages and views within the invention.

Clicking on each of the navigation headings 110-128 shown in FIG. 1.0 with a mouse or pointer, for example leads to additional screens or views for sub-categories of the heading that provide additional information and selection options for the user. Exemplary screenshots for these subcategories are further discussed below.

FIG. 2.2 is an exemplary screen shot of a Business Projects Summary page in accordance with an embodiment of the invention. The projects listed on this page include all projects for a FP's practice as well as all sub-steps of the projects that the current user is responsible for. These projects include, but are not limited to, projects linked to clients as well as projects not linked to any particular client. Additional action buttons of the Business Projects Summary page, as shown in FIG. 2.2 include, but are not limited to: "Create new project," 210, "Show completed projects," 212 and "View Templates" 214, for example. Details of a project can be seen by clicking on a particular project or project sub-step. Additionally, users can filter the information currently displayed by using the "Apply this filter" 216 action button.

FIG. 2.2.1 is an exemplary screen shot of a Project Detail page in accordance with an embodiment of the invention. Additional action buttons of this page, as shown in the "Project" 200 section in FIG. 2.2.1 include, but are not limited to: "Add a new project" 218, "Delete the entire project" 220, "Return to all projects" 222 and "Save this project as a template" 224. Action buttons in the "Project Step" 226 section of FIG. 2.2.1 include, but are not limited to: "Edit this step's members" 228, "Save this step" 230, "Add a sub-step to this step" 232, and "Delete this step" 234. All the details of a particular project are found on this page. By selecting an individual step (e.g., as shown in FIG. 2.2.1: "Send Fact Finder", "One Week Follow-up", etc.) from the list on the left side of FIG. 2.2.1, further details of that step can be shown on the right side. Each project, as displayed visually in a "tree" structure on the left, can have any number of steps, each of which can have any number of sub-steps, which in turn can have sub-steps, and so on, without limit. Further details of the operation of the Project Detail page are outlined in FIG. 2.2.1.

The Project Detail page allows users to assign responsibility of project steps to one or multiple individuals including, but not limited to, a specific client, client advisor, user of the system, the FP, a member of the FP's staff, or the FP's supervisor or auditor. In addition, project creation and expansion can also occur on this page. FP's can create multi-tiered projects. Each tier, or step, of the project can be assigned to people who are responsible for the completion of that step. An embodiment of the invention notifies each person as to any status changes via, for example: internal systems, e-mail, and active alerts. Additionally, each project step and sub-step relationship maintains appropriate "parent/child" rules (e.g. a parent step cannot be completed until each child step is completed). As discussed below, projects can also be saved as templates for future projects.

FIG. 2.2.2 is an exemplary screen shot of a Project Templates page in accordance with an embodiment of the invention. Action buttons of the Project Templates page, as shown in FIG. 2.2.2 include, but are not limited to: "Load this template" 236, "Delete this template" 238 and "Return to all projects" 240. Loading a template will create a new project based on the template selected. Further details of the operation of the Project Templates page are outlined in FIG. 2.2.2.

FIG. 2.3 is an exemplary screen shot of a Business Income Forecasting page in accordance with an embodiment of the invention. Revenue forecasting for the FP's practice is calculated using values gathered from fees the FP charges clients, from user created asset under management ("AUM") schedules, and from user defined commission and trail schedules. AUM and commission and trail schedules can be assigned to specific accounts. The values from these accounts are used with the specifically assigned schedules to produce revenue projections. Additionally, upfront commissions can be marked as having been paid so they are not double-counted in projections. Also, logic rules are used to calculate when future revenues can be expected. Further, users can input market growth factors to simulate how different market conditions would affect future income.

FIG. 2.3.1 is an exemplary screen shot of a Assets Under Management and Commission Schedules page in accordance with an embodiment of the invention. Users have the ability to create custom Asset Under Management ("AUM") schedules as well as Commission and Trail schedules. AUM schedules include account breakpoint tiers that can be assigned basis points. Users can create single or multiple tier AUM schedules. Multi-tier schedules can be calculated in a graduated or flat manner. The gradual manner takes into account any lower breakpoint and the corresponding basis point. The flat manner only takes the current tier's basis points into account.

Commission and Trail schedules are calculated in a similar manner to AUM schedules. However, commissions are investment product based and the user therefore must assign commissions and trails to individual products. The commission calculation also takes into account upfront commissions as well as subsequent payouts, or trails. The user identifies what month after a client's purchase that the trail starts and ends. The user also assigns basis points to each trail tier. Commissions may have multiple trail tiers.

The AUM and Commission and Trail schedules can be assigned to individual accounts and are used in the projection of a FP's future income as is shown in FIG. 2.3.

FIG. 2.4 is an exemplary screen shot of a Pending Recommendations page in accordance with an embodiment of the invention. This page lists the outstanding recommendations made to clients as well as a total value of all outstanding recommendations 242.

FIG. 2.5 is an exemplary screen shot of a Compliance Overview page in accordance with an embodiment of the invention. This page is a summary view of various compliance issues throughout the invention. This includes, but is not limited to, displaying relevant contact records, relevant files, and summaries on items such as outstanding audit items (in relation to an audit conducted through the Supervisory Module) 244, compliance items 246, continuing education 248, and compliance meetings 250. These items can be accessed in detail by clicking on the relevant item, thereby generating a response from the system. Additionally, the invention alerts the user through various means when the status of any item changes (e.g. the user receives an email when a new compliance issue is added). Further details of the operation and features of the Compliance Overview page are outlined in FIG. 2.5.

FIG. 3.1 is an exemplary screen shot of a Client Personal Information page in accordance with an embodiment of the invention. Personal information about the client can be stored, accessed or displayed. Non-limiting examples of this information include, but are not limited to: client pictures, multiple addresses, detailed dependant information, nick names and birthdates.

FIG. 3.2 is an exemplary screen shot of a Client Professional Information Setup page in accordance with an embodiment of the invention. Professional information about the client can be stored, accessed or displayed. Non-limiting examples of this information include, but are not limited to: occupation, work phone, email, and other professional associations.

FIG. 3.3A is an exemplary screen shot of a Client Journal (Overview) page in accordance with an embodiment of the invention. This page displays summary journal information for a specific client. This page also allows the user to create new journals, edit journal categories, and filter the journals currently being displayed. Selecting any displayed journal summary will load that specific journal into a new view as illustrated in FIG. 3.3B.

FIG. 3.3B is an exemplary screen shot of a Client Journal (Specific Journal View) page in accordance with an embodiment of the invention. Users have the ability to view journals, create new journals, edit existing journals, and delete journals. Exemplary entries in a journal include, but are not limited to, time and date information identified by the user, event description, event attendees, categories, subject, and journal notes. Additionally, the invention automatically identifies which user entered each journal note and when the note was entered (this information cannot be altered by the user). Further, once a journal note has been saved, the user does not have the ability to alter journal notes. This allows the user to identify without question when a specific journal note was written, who wrote it, and what was included in that note. Further, the journal is accessible from each contact's journal page that has been identified as an event attendee. Furthermore, specific digital files of the invention may also be linked to a specific journal. Selecting a specific existing journal note will load that specific note into a new view as illustrated in FIG. 3.3C.

FIG. 3.3C is an exemplary screen shot of a Client Journal (Zoom View) page in accordance with an embodiment of the invention.

FIG. 3.4 is an exemplary screen shot of a Client Specific Projects page in accordance with an embodiment of the invention. This page is similar in function to the Business Project Summary as identified previously in FIG. 2.2. The primary difference is that the projects identified in FIG. 3.4 are related to a specific client.

FIG. 3.5 is an exemplary screen shot of a Fee page in accordance with an embodiment of the invention. The Fee page functions include, but are not limited to: fee general information; specific details regarding past fees invoiced to the client; comparisons of the current client to other clients; a method for automatically calculating fees based on user-defined rules; and a method for automatically generating invoices for clients.

FIG. 3.6 is an exemplary screen shot of a Client Advisors page in accordance with an embodiment of the invention. The Client Advisors page provides a list of all of the client's advisors. FP's can link any number of contacts as an Advisor to any client. Non-limiting examples of the types of advisor information that can be stored, accessed or displayed include attorneys, accountants, doctors, and other FP's.

FIG. 3.7 is an exemplary screen shot of a Client Administration page in accordance with an embodiment of the invention. In Client Administration 3.7, users can set up an emergency login username and login password that they carry on their person in the event of a medical or other emergency. Clients of the FP will be able to designate specific digital files (e.g., living wills, medical allergies, etc) to be viewed by anyone logging in using their emergency login username and login password. Further details of the operation of the Client Administration page are outlined in FIG. 3.7.

FIG. 3.7.1 is an exemplary screen shot of a Client Administration (Permission View) page in accordance with an embodiment of the invention. Users can view the status and details of the specific client's activity within the Client Module. Additionally, users have the ability to view the Client Module as the client would see it. Users also have the ability to designate specific files to be visible to the client through the Client Module. These files can be grouped into folders that are defined at the client level. Further, users have the ability to reset a client password 310, unlock a client account 312, and remove a client's access rights to the Client Module 314.

FIG. 3.8A is an exemplary screen shot of a Client Wealth Overview page in accordance with an embodiment of the invention. The Client Wealth Overview page is a consolidation of information regarding a specific client's wealth including, but not limited to: a list of all balance sheet accounts related to the client; a list of all accounts in process for the client; net worth summaries for the client, their dependents, and estate entities within their control; insurance summaries; and graphical and numeric representations related to their asset allocation. Additionally, users can view consolidated information regarding portfolio holdings. Further, users can view account performance information. Users also have the ability to print several related reports from this page. These reports include, but are not limited to: balance sheets (for accounting, dependents, and outside of estate); portfolio accounts; accounts in process; portfolio holdings; portfolio holdings overlap; portfolio performance; account performance; portfolio allocation; and portfolio balance.

FIG. 3.8B is an exemplary screen shot of a Client Wealth Overview (Group and Style Detail) page in accordance with an embodiment of the invention. This page is identical in function to FIG. 3.8A with the exception of displaying the current portfolio allocation group and the equity style breakdown.

FIG. 3.8C is an exemplary screen shot of a Client Wealth Overview (Target Allocation Detail) page in accordance with an embodiment of the invention. This page is identical in function to FIG. 3.8A with the exception of adding functionality whereby the user can designate an investment model as the target portfolio for the current client.

FIG. 3.8D is an exemplary screen shot of a Client Wealth Overview (Allocation Balance Detail) page in accordance with an embodiment of the invention. This page is identical in function to FIG. 3.8A with the exception of displaying differences in allocation between the current allocation and the target allocation.

FIG. 3.8.2 is an exemplary screen shot of a Client Asset Overview page in accordance with an embodiment of the invention. Further details of the operation of the Client Asset Overview page are shown in FIG. 3.8.2.

FIG. 3.8.2.1 is an exemplary screen shot of a Client Asset Detail page in accordance with an embodiment of the invention. Detailed account information is displayed on this page. This information is gathered from manual data entry as we all as from various outside sources. Additionally, users have the ability to designate specific commission or asset under management models. The invention can calculate expected income for the FP based on these models and underlying value and transactional data. Users also have the ability to identify accounts not managed by the FP. Clients are made aware of this status in the Client Module. Further details of the operation of the Client Asset Details page are shown in FIG. 3.8.2.1.

FIG. 3.8.2.2 is an exemplary screen shot of a Client Asset Allocation page in accordance with an embodiment of the invention. This page provides the users with the ability to graphically display the allocation of assets as well as the allocation group and equity style. Users can manually enter allocation information, gather it through an external source, or use the allocation of a linked product. Further details of the operation of the Client Asset Overview page are shown in FIG. 3.8.2.2.

In Client Asset Allocation, FP's can evaluate risks associated with each investment/asset and to identify situations where a client's investment strategy varies from the client's risk profile.

FIG. 3.8.2.3 is an exemplary screen shot of a Client Asset Holdings and Grants page in accordance with an embodiment of the invention. Account holding information may be entered manually or may be populated from external sources. The invention uses the information to calculate taxable gains or losses and the percent of the account represented by each individual holding. Further details of the operation of the Client Asset Holdings and Grants page are shown in FIG. 3.8.2.3.

FIG. 3.8.2.4 is an exemplary screen shot of a Client Asset History page in accordance with an embodiment of the invention. The capabilities of this page allow the user to track account values manually or have these values automatically populated by external sources. Further details of the operation of the Client Asset History page are shown in FIG. 3.8.2.4.

FIG. 3.8.3 is an exemplary screen shot of a Client Insurance Overview page in accordance with an embodiment of the invention. Further details of the content of the Client Insurance Detail page are shown in FIG. 3.8.3.

Additionally, users can track insurance details, allocation, holdings, history, and transactions in a manner similar to assets as shown in FIG. 3.8.2.

FIG. 3.8.4 is an exemplary screen shot of a Client Investment Checks page in accordance with an embodiment of the invention. Users can track checks written by clients. Further, the source and destination of the funds can be tracked as well. Users can track any check received or written from any account. Users may also link an image of the referenced check to the record. Further details of the operation of these pages are shown in FIG. 3.8.4.

FIG. 3.8.5 is an exemplary screen shot of a Client Liabilities page in accordance with an embodiment of the invention. This page allows users to track details of a client's debt. Further details of the operation of these pages are shown in FIG. 3.8.5.

Additionally, users can track liability details, secured assets, history, and transactions in a manner similar to assets as shown in FIG. 3.8.2.

FIG. 3.8.6 is an exemplary screen shot of a Client Cash Flow page in accordance with an embodiment of the invention. Detailed information on income and expenses can be tracked on this page.

Additionally, the invention can calculate future cash flow projections using a combination of the cash flow data, account information specifics, client specifics (e.g. retirement date), and projection assumptions. The user has the ability to input assumptions to improve projection accuracy (e.g. growth rates, tax information). Further details of the operation of these pages are shown in FIG. 3.8.7.

FIG. 3.8.7 is an exemplary screen shot of a Client Estate page in accordance with an embodiment of the invention. Users can store detailed information regarding a client's estate documents and entities. Additionally, users are notified when it is time for certain documents to be reviewed again. Further, estate entities can be the owner for specific accounts. This allows the proper identification of account ownership as well as the creation of proper balance sheets and other documents. Further details of the operation of these pages are shown in FIG. 3.8.7.

FIG. 3.8.8 is an exemplary Client Assets Under Management (AUM) Overview screen. This page provides the capability to graphically display AUM income charts in relation to the selected client as compared to an average of all other clients. Additionally, this page lists all accounts with AUM schedules assigned to them. Further, this page displays projected income received by the FP based on this client's AUM schedules. Furthermore, calculations for each individual account may be displayed by selecting one of the displayed accounts. Users can select to have calculations completed based in each individual asset, or by grouping individual assets according to AUM schedule as to take advantage of AUM schedule tier breakpoints. Further details of the operation of these pages are shown in FIG. 3.8.8.1.

FIG. 3.8.9 is an exemplary screen shot of an Aggregation page in accordance with an embodiment of the invention. In Aggregation 3.8.9, users can aggregate the following, but is not limited to, account values, cost basis, dates, account numbers, transactions, specific details on holdings, performance related information, asset allocation, equity style, of clients' assets, liabilities, insurance policies, reward points, etc. through third party (e.g. Yodlee Inc.) and proprietary services. This information is updated automatically.

Additionally, users have the ability to create local accounts based on the aggregated information. Once an account is created from, or linked to, a local account, all relevant aggregated information regarding the account will remain updated from the various aggregation sources.

FIG. 3.9 is an exemplary screen shot of a Contact page in accordance with an embodiment of the invention. Users have the ability to load people who are not clients. These types of people include, but are not limited to; business contacts; personal contacts; and client dependents. The information regarding these people is displayed on a page similar to the one shown in FIG. 3.9.

Additionally, users have the ability to journal to any contact with similar functions to the journaling capabilities for clients. Users also have the ability to file directly to contacts in a similar manner to the filing to clients Further, users have the ability to "upgrade" contact records to client records. Doing so would give the upgraded contact all functionality available for clients. Further details of the operation of these pages are shown in FIG. 3.9.

FIG. 4.1 is an exemplary screen shot of a Company Detail page in accordance with an embodiment of the invention. In addition to keeping specific details on the company such as any number of locations and their addresses and phone numbers, this page displays all employees and contacts of the company. Employees are cross referenced with all clients and contacts and will populate for any company of which the contact or client is an employee of FIG. 4.2 is an exemplary screen shot of a Company Benefit Plan Detail page in accordance with an embodiment of the invention. Users can store, access, print, or display details of any number of company plans including, but not limited to the information regarding the benefit: at retirement; early retirement; termination; disability; and death. In addition, users can link this information directly to supporting digital files.

FIG. 4.3 is an exemplary screen shot of a Company Journal page in accordance with an embodiment of the invention. Users have similar journal functionality, as discussed above, for any company for clients and contacts.

FIG. 5.1 is an exemplary screen shot of a Product Overview and Research page in accordance with an embodiment of the invention. In addition to storing details regarding the specific product, users have the ability to add any number of research notes. The invention automatically records the user who entered each note as well as when the note was created. Once created, the notes cannot be altered.

Additionally, the user can compare each product to any number of additional products. Further, broker/dealers have the ability to populate product information as well as underlying research data. Users who are affiliated with the broker/dealer would be able to access these product records.

FIG. 5.2 is an exemplary screen shot of a Product Allocation page in accordance with an embodiment of the invention. Users have the ability to manually enter an allocation for a product or populate allocation information from external sources.

FIG. 5.3 is an exemplary screen shot of a Product Owners and Revenue page in accordance with an embodiment of the invention. This page provides the capability to graphically display commission and trail income charts in relation to the selected product as compared to an average of all other products. Additionally, this page lists all accounts with commission and trail schedules assigned to them. Further, this page displays projected income received by the FP based on this products commission schedules. Furthermore, calculations for each individual account may be displayed by selecting one of the displayed accounts. Further details of the operation of these pages are shown in FIG. 5.3.

FIG. 6.1 is an exemplary screen shot of a Model Portfolio page in accordance with an embodiment of the invention. Users can create and track investment models by adding any number of products and assign a weighted model percentage to each. The weighted percentage represents how much of the model is represented by that product. Further, the embodiments of the invention calculate the weighted asset allocation of each product in the model and present a resulting asset allocation and allocation grouping breakdown for that particular model. The source of each underlying allocation is pulled from each respective product's allocation. These models can be used as a target allocation for individual client portfolio's to be compared against as shown in FIG. 3.8C.

FIG. 7.1 is an exemplary screen shot of an Administration page in accordance with an embodiment of the invention. Users designated as an "Advisor" have the ability to assign permissions to other users. Permissions include the ability to access the system, view various pages, and the ability to add, edit, or delete various types of information. Users also have the ability to give permissions for users in additional installations of invention access to specific records with specific permissions.

Additionally, users have the ability to manage their practice's branding as seen in the Client Module. This involves custom graphics and text that can be changed by the user at any time.

Further, users have the ability to set their preferences within the system (e.g. receiving automated email alerts from the system).

FIG. 8.1 is an exemplary screen shot of a Reports page in accordance with an embodiment of the invention. Users have the ability to create pre-defined and custom reports. These reports can be displayed in several file formats including, but not limited to, PDF, spreadsheet, rich text, and html.

FIG. 9.1A and FIG. 9.1B are exemplary screen shots of a File Upload Center Setup page in accordance with an embodiment of the invention. The list of "Items not yet tagged" shown on these pages are files that have been uploaded but have not completed the filing (a.k.a. "tagging") process for this particular location. Files can be uploaded by the user or automatically uploaded via a pre-defined relationship. Users can edit specific file properties before completing the filing process by tagging them.

Files are location based meaning they are assigned to specific items such as, but not limited to, specific people, companies, products, the advisor's practice, and calendar dates. The screen shots show in FIG. 9.1A and FIG. 9.1B are representative of an upload center for a specific location. Further details of the operation of this page are shown in FIG. 9.1A and FIG. 9.1B.

Furthermore, FPs can store, access and display digital files can be stored in a non-erasable and unalterable format for a length of predetermined time. Storing a document in compliant vs. standard storage format is an election that can be made by the FP. The present invention uses the FPs chosen file methods/styles; dates; pre-defined and user defined keywords or tags, as defined above; and other methods to identify and ease the retrieval and display of stored files.

Moreover, files can also be linked to specific items within the present invention for "location based" retrieval later. (e.g., a statement for a particular client's investment can be linked to that exact investment. When viewing that investment in the client's asset view, the FP can click "Filing" and see all related documents to that particular asset.) Different versions of the same file/document can be created so that a FP can make changes to a document, but retain the original document in an unaltered state to comply with laws, regulations, and rules.

FIG. 9.1.1 is an exemplary screen shot of a File Being Tagged page in accordance with an embodiment of the invention. The tagging process is the final step for the user in the filing process. The user may assign tags to a single or multiple files at once. Tags are user defined identifiers to aid in proper storage, retrieval, and retention of files. Users may assign any number of tags to each file.

Additionally, users may also tag a file with any number of balance sheet accounts (if tagging a client file) that are, or have been, under control of that client.

Further, users may create tag groups that consist of multiple tags. These tag groups may be loaded in a future tagging session assisting consistent use of file tags.

Furthermore, tags may be assigned a specific retention period (see FIG. 9.2). If a user tags a file with tag that has been assigned a retention period, the invention will keep the file in a non-alterable and non-erasable state until the end of the retention period. An embodiment of the invention allows for multiple tags using multiple retention periods. The invention uses all tags and retention periods within each file to continually calculate the minimum retention date ("MRD"). This date is the earliest date a file can be altered or destroyed (erased).

Additionally, an embodiment of the invention allows the users to re-file (e.g. move a file to a different location and assign new tags) files that have been previously filed incorrectly. To ensure users do not "cheat" the retention compliance system, the invention retains a complete filing history for each file which includes any previous MRD. When calculating a current MRD for a file, the invention also takes into account any previous MRD for the file and ensures that the current MRD cannot occur before any historical MRD.

Further, once a file has been tagged, it is automatically copied and converted to the current ISO standard for long term digital document preservation (e.g. PDF/A-1a) and is copied to a write once read many ("WORM") media format. The user also retains the original file format accessible on non-WORM media. Files that are stored in WORM media are arranged on media that is specific to its corresponding MRD. This enables the proper files to be destroyed en-masse after their MRD's have been met. Further details of the operation of this page are outlined in FIG. 9.1.1.

FIG. 9.2 is an exemplary screen shot of a File Retention Period Setup page in accordance with an embodiment of the invention. Users have the ability to create retention periods. These periods are lengths of time measured in years and months for a specific event. These events include, but are not limited to, a document date, an account opening, an account closing, a termination of a relationship, and any user defined event. Additionally, users can assign tags to specific retention periods. Further details of the operation of this page are outlined in FIG. 9.2.

FIG. 9.3 is an exemplary screen shot of a File Search page in accordance with an embodiment of the invention. File searches can be conducted by searches of specific fields including, but not limited to, upload date ranges, document date ranges, file author, file tag, file name, and MRD. Additionally, files may be searched by utilizing a visual representation of file tags as shown on the left of FIG. 9.3. Selecting individual tags will filter the search results list (as shown on the right of FIG. 9.3) to display the files found within that tag. Files that have been assigned specific balance sheet account tags will have the ability to be displayed by selecting that specific account tag. Files will appear within every tag that it has been assigned.

Additionally, selecting a specific file will display the file details (as seen on the lower right of FIG. 9.3). File details include, but are not limited to, the file ID, file name, file cabinet, file folder, file author, file details, upload date, document date, MRD, filing history, and file tag and retention period details.

Users have the option to open or re-file an file. Files that have an MRD that is later than the current date cannot delete or alter the file. Further details of the operation of this page are outlined in FIG. 9.3.

FIG. 9.4 is an exemplary screen shot of a File Tags page in accordance with an embodiment of the invention. Users have the ability to create and modify file tags. File tags can be assigned to appear in one or more filing cabinets during their respective tagging process. These filing cabinets include, but are not limited to, people, companies, products, the FP's business, and specific dates.

Further, users have the ability to create tag groups. These groups can be assigned a name and any number of filing tags. These tag groups are used during the filing process to assist in tagging consistency. Further details of the operation of this page are outlined in FIG. 9.4.

FIG. 9.5 is an exemplary screen shot of a Files Not Yet Tagged page in accordance with an embodiment of the invention. This page consolidates all files that have not yet completed the tagging process. Clicking on an untagged file will allow the user to properly complete the filing process by adding appropriate tags. Users also have the ability within this page to upload files to multiple locations. Further details of the operation of this page are outlined in FIG. 9.5.

FIG. 10 is an exemplary screen shot of a Supervisor Home page in accordance with an embodiment of the invention. This page displays all open audits being conducted by the current supervisor user. Additionally, supervisor users have the ability to, but not limited to, audit an advisor, oversee an advisor, find files, and manage their settings.

Auditing an advisor allows a supervisor to conduct comprehensive audits on specific advisors and advisor groups.

Overseeing an advisor allows a supervisor to view advisor and advisor group details in much the same way as they would for an audit. However, an embodiment of the invention does not automatically track the actions of the supervisor. Additionally, the supervisor does not have the ability to create "Action Items" for the underlying advisor. This section is designed to facilitate a less official audit than an actual and official audit.

Finding files allows supervisors to search for files using a variety of search methods. The file search does not have to be advisor or advisor group specific. For example, the supervisor could search for all files with the "Complaint" tag that had been uploaded in the last quarter of the previous year.

Throughout the supervisory module, the supervisor has capabilities including, but not limited to, creating notes, marking items for follow-up, marking items as suspicious, marking items as deficient, marking items as illegal, marking items as questionable, marking items as unacceptable, notifying other supervisors of specific items, notifying FP's of specific items, extending the MRD of any file, viewing any file, and copying files.

FIG. 10.1 is an exemplary screen shot of a Supervisor Audit (Practice Selection) page in accordance with an embodiment of the invention. This page allows supervisors to select a specific advisor or advisor group. After selecting an advisor or advisor group, the supervisor is presented with details on the advisor group as well as any audits.

Additionally, the supervisor has the option to load an existing audit, or to create a new audit. Further details of the operation of this page are outlined in FIG. 10.1.

FIG. 10.1.1 is an exemplary screen shot of a Supervisor Audit (Home) page in accordance with an embodiment of the invention. This page displays the audit creation notes (as shown in the upper left hand corner of FIG. 10.1.1).

Further, all actions that have occurred with each audit are automatically recorded and displayed for review.

Additionally, the supervisor has the ability to perform several functions. These include, but are not limited to, creating action items, audit specific clients, audit specific products, audit business files of the advisor, audit files that have been grouped by date, and audit files on companies the advisor has stored.

Creating action items allows the supervisor to make requests or notifications to the underlying advisor. The advisor is automatically notified of such requests and notifications through various means (e.g. automated emails and notifications within the Advisor Module). The advisor has the option to respond to each action item within the Compliance section of the Advisor Module (see FIG. 2.5). The supervisor is automatically notified of any response made by the advisor to each action item. The supervisor has the ability to mark these responses that identify if the response satisfies the original request or requires more input from the advisor. An embodiment from the invention will notify the advisor of any follow-up actions that are required.

Auditing a client allows the supervisor to view details on any number of specific clients of the FP. These details include, but are not limited to, client financial information, client employment details, client age, client files, journals written regarding the client, and client accounts. Further details of the operation of this page are outlined in FIG. 10.1.2.

Auditing product information allows the supervisor to view details on any number of products input by the FP. These details include, but are not limited to, product use status, client accounts that are invested in the product, product research, comparable products, and product files.

Auditing business files allows the supervisor to view files and file details on the files that have been filed under the FP's business. These details include, but are not limited to, the file ID, file name, file cabinet, file folder, file author, file details, upload date, who filed the document, document date, MRD, filing history, and file tag and retention period details.

Auditing files grouped by date allows the supervisor to view files and file details on the files that have been filed under a specific date. These details include, but are not limited to, the file ID, file name, file cabinet, file folder, file author, file details, upload date, who filed the document, document date, MRD, filing history, and file tag and retention period details.

Auditing files on other companies allows the supervisor to view files and file details on the files that have been filed under specific companies other than the FP's company. These details include, but are not limited to, the file ID, file name, file cabinet, file folder, file author, file details, upload date, who filed the document, document date, MRD, filing history, and file tag and retention period details.

Further, the supervisor has the ability to extend the MRD of any file they choose. An embodiment of the invention records these changes and adds them to the file history.

FIG. 10.1.2 is an exemplary screen shot of a Supervisor Audit (Specific Client) page in accordance with an embodiment of the invention. This page allows a supervisor to conduct an audit on a specific client within a specific FP's practice. Client details as well as a list of all audit items specific to the selected client in the current audit are displayed (see the lower half of FIG. 10.1.2). Additionally, the supervisor has the ability to conduct several actions including, but not limited to, creating an action item specifically regarding the currently selected client, viewing the selected client's files and the file details, viewing journals written by the FP regarding the selected client, and viewing the selected client's accounts.

FIG. 11.1 is an exemplary screen shot of a Client Module (Home) page in accordance with an embodiment of the invention. The Client Portal is accessed by clients of the FP. The page represented in FIG. 11.1 displays an overview of information for the client. This page displays, but is not limited to, the following items: net worth calculations; insurance totals; current account listings and values; account location chart; account aggregation identifiers; unmanaged account identifier; an image selected by the FP; text and text headings as selected by the FP; and buttons to other areas of the Client Module.

FIG. 11.2 is an exemplary screen shot of a Client Module (Account Detail) page in accordance with an embodiment of the invention. Client users are presented with a similar page by clicking in a specific account. This page view displays, but is not limited to: basic account statement information; account history; account allocation; account holdings; account transactions; account performance; account aggregation status. Additionally, clients can link directly to the underlying institution's online presence (e.g. web site).

FIG. 11.3 is an exemplary screen shot of a Client Module (Files) page in accordance with an embodiment of the invention. Client users have the ability to view files that the FP has designated as visible to the client. FP's have the ability to create custom folders on the client levels. Only folders with files in them are visible. Clients can view file details as well as open any file.

Additionally, clients have the ability to create "Emergency logins" and designate specific files to be viewable by such emergency logins. Clients are provided with a "wallet card" template that allows them to carry the emergency login credentials along with instructions on their person. This emergency login could then, for example, be carried in the wallet of the client. In the event of an emergency, for example, one in which the client is incapacitated and hospitalized, emergency personnel could find and use the emergency login to access files. These files could include such things as medical directives, living testaments, religious instructions, etc.

FIG. 12 is an exemplary illustration of non-limiting examples of the user types and their connection to the three modules in accordance with an embodiment of the invention. Various user types have inherent permissions to the various modules in an embodiment of the invention. All modules share portions of the data of the invention.

FIG. 13.1 is an exemplary illustration of the Filing Process (Adding) in accordance with an embodiment of the invention. This flow chart identifies the process by which Files or File Data Files are added to an embodiment of the invention. An embodiment of the invention allows files to be uploaded by users or by external sources which may be automated. Additionally, the invention allows the manual or automatic upload of "File Data". File Data is the data that would be found within a specific file (e.g. account statement data). Each File Data file that is uploaded would have a corresponding File Generation Template. This template allows an embodiment of the invention to generate files (e.g. account statements) based on the combination of the File Data and the corresponding templates. Further details of the operation of this page are outlined in FIG. 13.1. As is depicted therein, the filing process begins with a user, external source, or automated process uploading or otherwise transfers files. This process is depicted as step 410. Once the files are uploaded, file metadata is stored in a database (step 412) and the file or raw file data type is stored separate from metadata (step 414). Once this process has been completed, a determination is then made as to whether the file is an automated file type. This determination is depicted as step 416. If the answer is yes, a determination is then made as to whether the file is a true file or raw file data (step 418).

If the file is a true file, then in accordance with step 420, the proper file location, tags and retention periods based on metadata are automatically assigned. The files are then copied then converted to the ISO standard for long term preservation of electronic documents (currently PDF/A) in accordance with step 430, and then moved to the appropriate WORM media in accordance with step 432, at which point the filing is complete as depicted by step 434. Returning to step 418, if it is determined that the file is not a true file, but rather comprises raw file data, then in accordance with step 422, file data is automatically assigned along with the proper location, tags and retention periods. The file data is then moved to WORM media as depicted by step 426, and the filing is then completed as depicted in step 434.

Returning now to step 416, if it is determined that the file is not an automated file, then the user assigns the proper file location and tags in accordance with step 424, after which retention periods are automatically assigned as shown in step 428. Steps 430, 432 and 434 are then performed as detailed above.

FIG. 13.2 is an exemplary illustration of the Filing Process (Retrieving) in accordance with an embodiment of the invention. This flow chart identifies the process by which files are retrieved from an embodiment of the invention. Further details of the operation of this page are outlined in FIG. 13.2. As is depicted therein, the retrieving filing process is initiated as depicted in step 440 by the user searching metadata for a specific file. The file identified by step 440 is then selected for retrieval in accordance with step 442. At this stage, a determination is made as to whether the user requires a file stored on WORM media in accordance with step 444. If the answer is yes, then a determination is made as to whether the file is a true file as opposed to raw file data is depicted in step 446. If the answer is yes, then a matching file on WORM media is downloaded as depicted in step 448, thus completing the retrieval process as depicted in step 458.

Returning to step 446, if the file is not a true file, then a file data file type is matched with the appropriate file generation template in accordance with step 452. A file is then generated from a combination of file data and file generation templates in accordance with step 454 and the file is downloaded to the user as depicted in step 456 thereby completing the retrieval process according to step 458. Returning now to step 444, if the answer is no, then a matching file on non WORM media is downloaded to the user as depicted in step 450, thereby completing the retrieval process as depicted in step 458.

FIG. 13.3 is an exemplary illustration of the File Location Structure in accordance with an embodiment of the invention. Files are stored and identified in a location hierarchy. This hierarchy consists of filing cabinets that contain file folders that contain file tags. Each subset is specific to the parent set. For example, the folders for the filing cabinet "People" are individuals within the database. The file tags for the individual people folders are specific to people.

Additionally, while subsets are dependent on their parent step, they do not have to be mutually exclusive. For example, the tag "Correspondence" may be used for the People filing cabinet as well as the Company and Grouped By Date filing cabinets. Further details of the operation of this page are outlined in FIG. 13.3.

Figure 14:
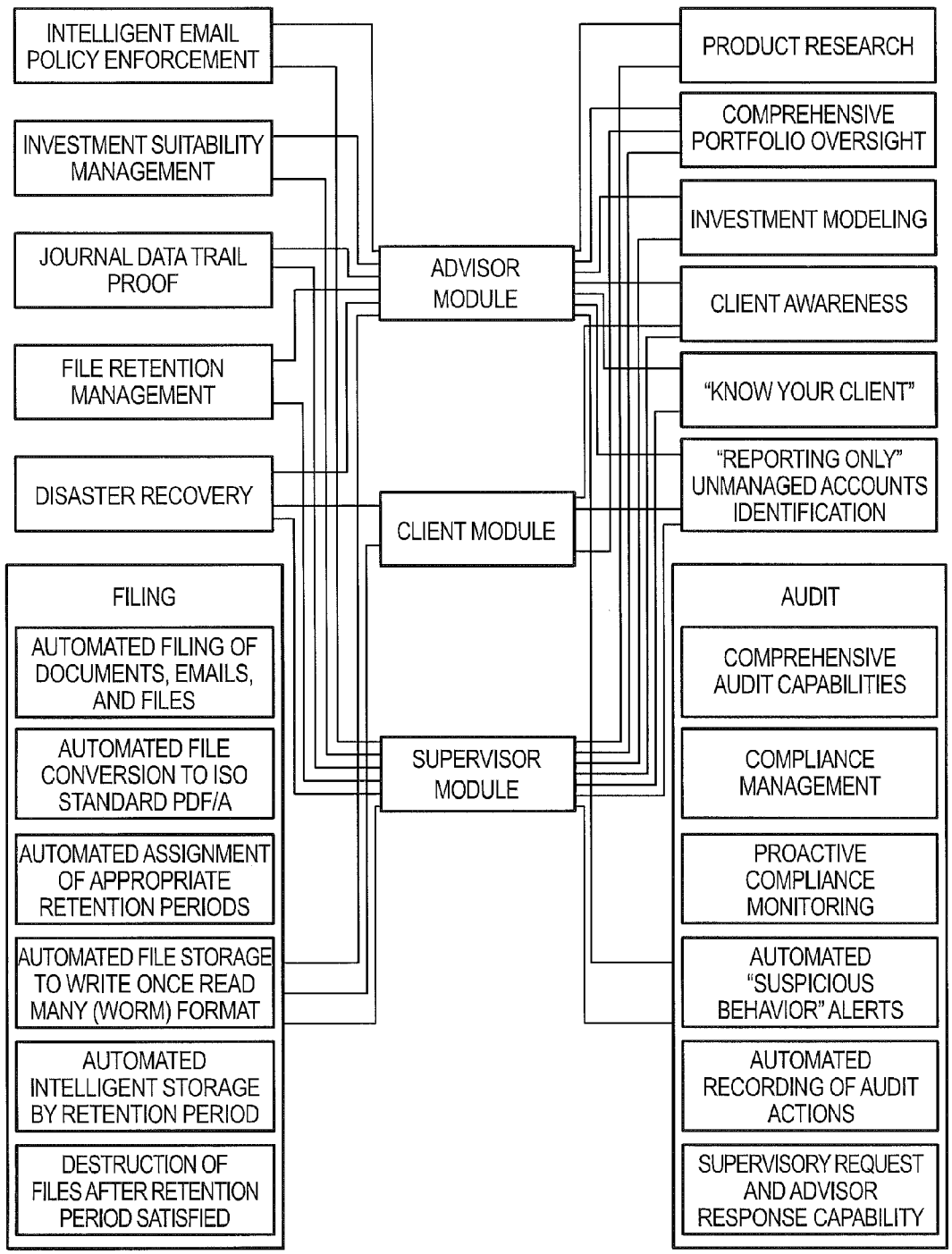
FIG. 14 is an exemplary illustration of the interconnection of the three modules (Advisor, Client, and Supervisor) and the various compliance embodiments of the invention.

FIG. 14 is an exemplary illustration of several compliance specific relationships and connections among the advisor module, client module, and supervisory module in accordance with an embodiment of the invention. The invention is designed to aid in compliance with laws, statutes, rules, and regulations specific to the FP industry.

Figure 15:
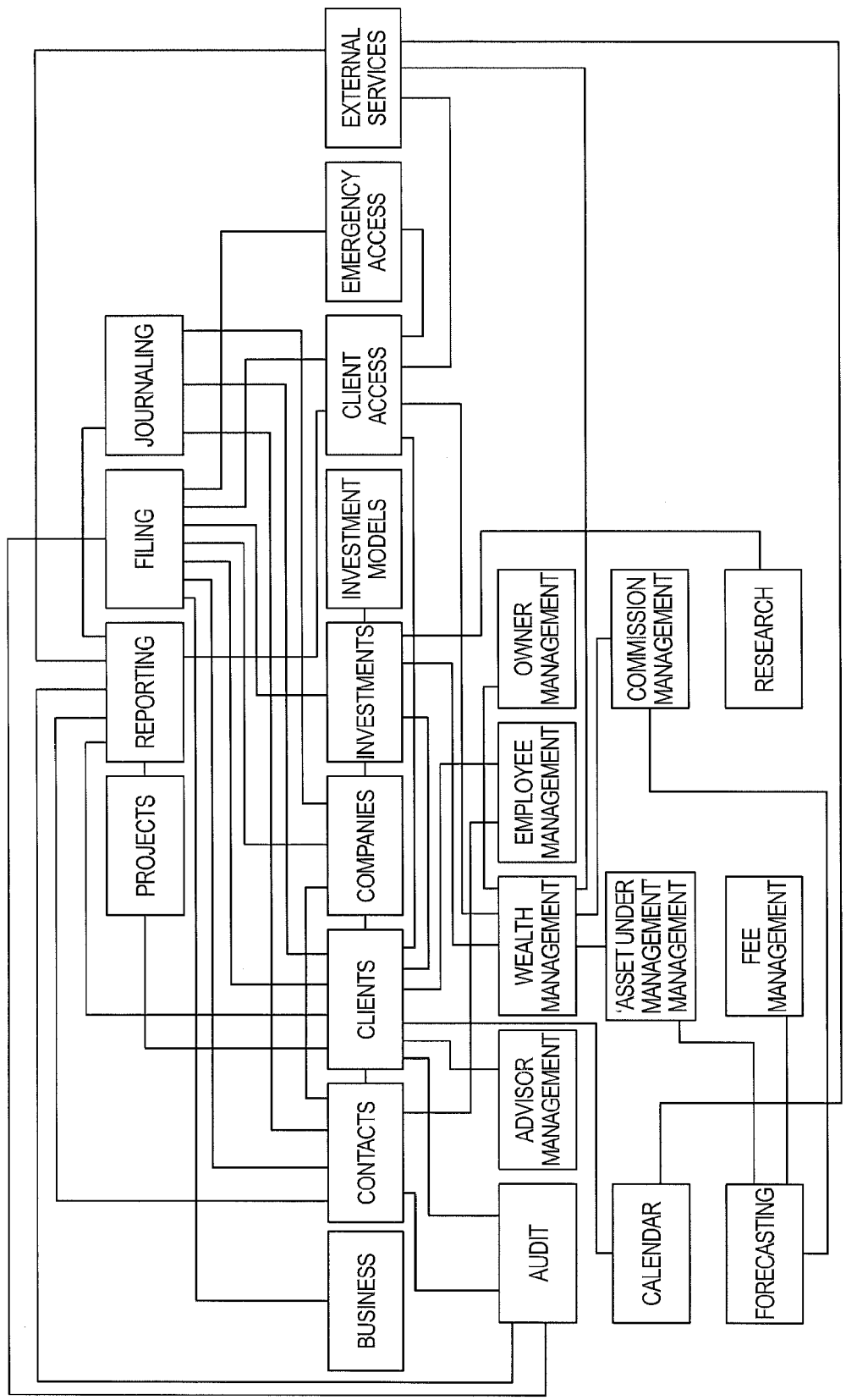
FIG. 15 is an exemplary illustration of the interconnection relationships between the various functions of the embodiments of the invention.

FIG. 15 is an exemplary illustration of the interconnection relationships between the various functions of the embodiments of the invention.

Figure 16:
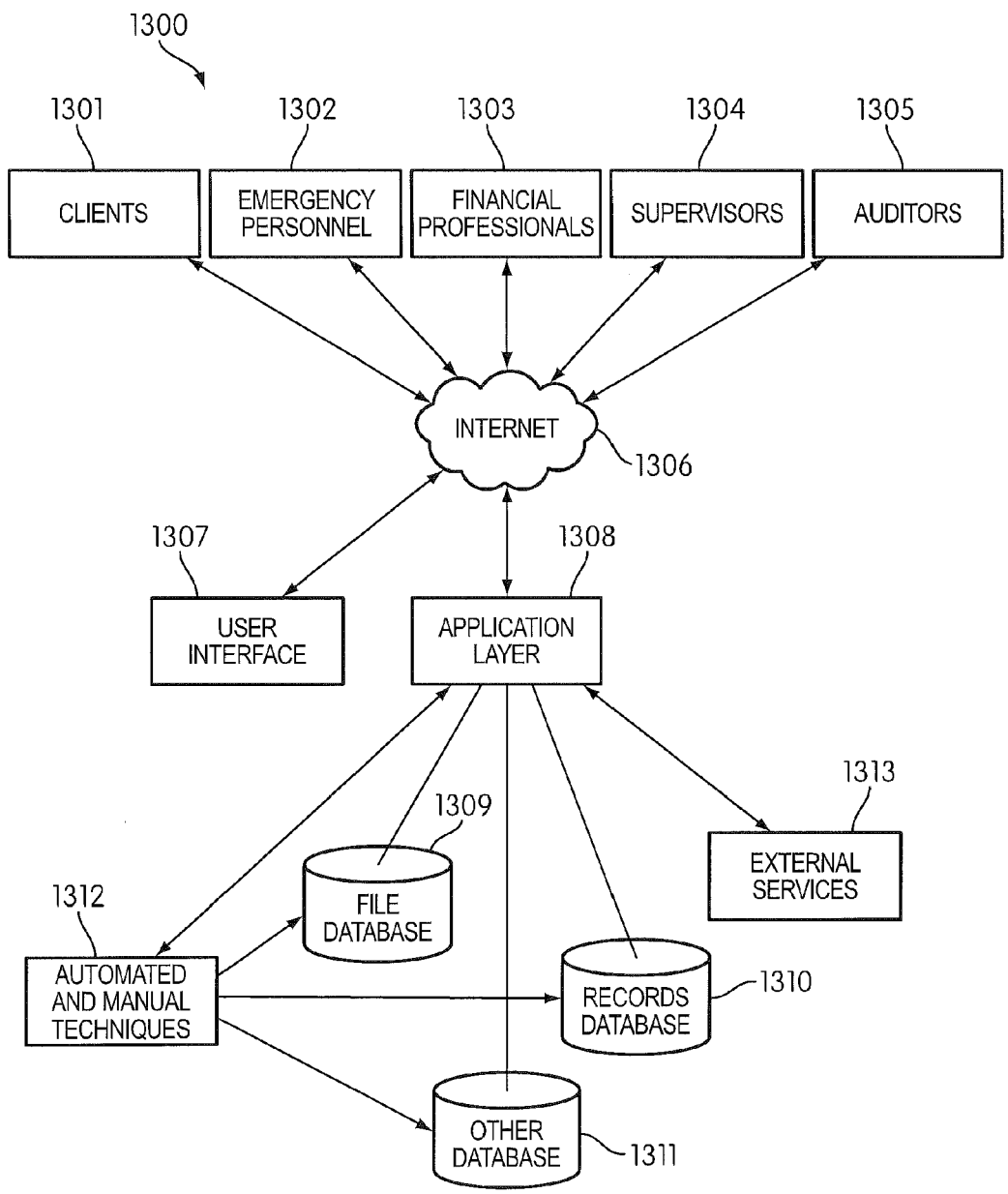
FIG. 16 is an exemplary System Level Technical Diagram of an embodiment of the invention.

FIG. 16 is an exemplary high level technical diagram of the present invention. The system of the present invention provides various services, modules, functions, and access to information. Users of the various modules 510-514 (as shown in FIG. 12) may interface with the User Interface 518 which in turn interfaces with the Application Layer 520 through the Internet. Access to additional information may be available through databases that include, but are not limited to a file database 526; a records database 528; and other databases 530. Additionally, access to information may be available through additional various storage methods such as hard disk drives 524 and WORM (Write Once Read Many) drives. Data for these databases may be stored and gathered by various methods, such as automated techniques 532 (e.g. web crawlers, web spiders, etc.) or manual techniques (e.g., data entry of users). Further, information may be stored and gathered via External Services 522 (e.g. third party aggregation services). Information for the system may be stored in a single database or separate databases.

The foregoing description illustrates and describes the present invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such or other embodiments and with the various modifications required by the particular applications or uses of the invention. Accordingly, the description is not intended to limit the invention to the form or application disclosed herein. Also, it is intended that the appended claims be construed to include alternative embodiments.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method for integrating and managing information, documents, and compliance, the method comprising:
    accessing client data wherein the client data comprises an associated account portfolio and a client profile;
    retrieving integrated data from a database wherein the integrated data is related to the client data and is compiled from at least one of a plurality of sources;
    analyzing the retrieved integrated data in accordance with the client profile;
    enriching the analyzed retrieved integrated data by graphically displaying at least one of performance data, accuracy data, pricing data, benchmark data and historical data associated with the associated account portfolio;
    communicating the analyzed retrieved integrated data between at least the client and at least an advisor to enable the client and the advisor to collaborate on the analyzed retrieved integrated data; and
    displaying the analyzed retrieved integrated data based on display specifications which comprise at least one of client defined display specifications and default display specifications.

2. The method according to claim 1 wherein the associated account portfolio comprises account data from a plurality of accounts from a combination of sources.

3. The method according to claim 1 wherein the client and the advisor interact jointly with at least each other to access and exchange information related to the analyzed retrieved integrated data to establish a wealth management plan.

4. The method according to claim 1 wherein the client and the advisor collaborate simultaneously in real time.

5. The method according to claim 1 wherein the plurality of accounts comprises one or more of cash accounts, demand deposit accounts, checking accounts, savings accounts, credit card accounts, loan accounts, investment accounts, trust accounts, brokerage accounts, securities accounts, real estate accounts, certificate of deposit accounts, risk management accounts, insurance accounts, derivatives and mortgage accounts.

6. The method according to claim 1 wherein the retrieved aggregated data is further analyzed in accordance with at least one client input.

7. The method according to claim 6 wherein the at least one client input comprises a client initiated financial query related to the associated account portfolio.

8. The method according to claim 1 wherein the advisor is a financial planner.

9. A computer-based method for integrating and managing information, documents, and compliance, the method comprising:
    accessing client data wherein the client data comprises an associated account portfolio and a client profile;
    retrieving integrated data from a database wherein the integrated data is related to the client data and is compiled from at least one of a plurality of sources;
    analyzing the retrieved integrated data in accordance with the client profile;
    enriching the analyzed retrieved integrated data by graphically displaying at least one of performance data, accuracy data, pricing data, benchmark data and historical data associated with the associated account portfolio;
    communicating the analyzed retrieved integrated data between at least the client and at least an advisor to enable the client and the advisor to collaborate on the analyzed retrieved integrated data; and
    displaying the analyzed retrieved integrated data based on display specifications which comprise at least one of client defined display specifications and default display specifications.

10. The method according to claim 9 wherein the associated account portfolio comprises account data from a plurality of accounts from a combination of sources.

11. The method according to claim 9 wherein the client and the advisor interact jointly with at least each other to access and exchange information related to the analyzed retrieved integrated data to establish a wealth management plan.

12. The method according to claim 9 wherein the client and the advisor collaborate simultaneously in real time.

13. The method according to claim 9 wherein the plurality of accounts comprises one or more of cash accounts, demand deposit accounts, checking accounts, savings accounts, credit card accounts, loan accounts, investment accounts, trust accounts, brokerage accounts, securities accounts, real estate accounts, certificate of deposit accounts, risk management accounts, insurance accounts, derivatives and mortgage accounts.

14. The method according to claim 9 wherein the retrieved aggregated data is further analyzed in accordance with at least one client input.

15. The method according to claim 14 wherein the at least one client input comprises a client initiated financial query related to the associated account portfolio.

16. The method according to claim 9 wherein the advisor is a financial planner.

17. A system for integrating and managing information, documents, and compliance, the system comprising:
- means for accessing client data wherein the client data comprises an associated account portfolio and a client profile;
- means for retrieving integrated data from a database wherein the integrated data is related to the client data and is compiled from at least one of a plurality of sources;
- means for analyzing the retrieved integrated data in accordance with the client profile;
- means for enriching the analyzed retrieved integrated data by graphically displaying at least one of performance data, accuracy data, pricing data, benchmark data and historical data associated with the associated account portfolio;
- means for communicating the analyzed retrieved integrated data between at least the client and at least an advisor to enable the client and the advisor to collaborate on the analyzed retrieved integrated data; and
- means for displaying the analyzed retrieved integrated data based on display specifications which comprise at least one of client defined display specifications and default display specifications.

18. The system according to claim 17 wherein the means for communicating the retrieved integrated data comprises at least one of the internet and e-mail.

19. The system according to claim 17 wherein the means for displaying the retrieved integrated data comprises a display monitor and a graphical user interface.

20. The system according to claim 17 wherein the means for retrieving the integrated data comprises a computer.

21. A computer-implemented method for integrating and managing information, documents, and compliance among financial professionals, financial professional's clients, and financial professional's supervisors comprising:
- providing a user interface for allowing the graphical selection, display and representation of information and commands related to data associated with a financial professional's practice;
- accessing the data associated with the financial professional's practice;
- retrieving integrated data from one or multiple databases wherein the integrated data is related to the financial professional's practice data and is compiled from at least one of a plurality of sources; and
- analyzing the retrieved integrated data by applying at least one of a plurality of operational applications, wherein the plurality of operational applications comprises a filing application, an audit application, a compliance application, a management application and a portfolio application and wherein the selective application of at least one of the plurality of operational applications allows a user of the method to analyze the retrieved integrated data in a manner consistent with their personal style of information management.

22. The method according to claim 21 wherein the filing application creates retention periods and assigns them to tags, assigns tags that are bound to retention to specific data files and calculates the proper minimum retention date.

23. The method according to claim 22 wherein the filing application retains filing history including historical minimum retention dates for each electronic file, thereby enabling the user to re-assign electronic files while maintaining minimum retention date integrity.

24. The method according to claim 22 wherein the filing application prevents users from altering or deleting files before the date established by the minimum retention date.

25. The method according to claim 22 wherein the filing application converts files to the current ISO standard for the long term preservation of electronic documents.

26. The method according to claim 22 wherein the filing application stores files on WORM media specific to minimum retention dates to allow the destruction of files after the date required by the minimum retention date.

27. The method according to claim 22 wherein the filing application permits access to files by the user and a supervisor and maintains supervisor access even after the user no longer has access to the files.

28. The method according to claim 22 wherein the filing application automatically files electronic files based on pre-defined metadata rules.

29. The method according to claim 22 wherein the filing application uses a combination of raw file data and corresponding templates to generate complete files.

30. The method according to claim 21 wherein the audit application consolidates user data in a manner relevant and conducive to an audit by the user's superiors and creates an environment by which audits can be performed remotely.

31. The method according to claim 21 wherein the audit application enables a request and response system between a user and their supervisor for both general and specific audit items and automatically tracks all actions taken by a user or supervisor.

32. The method according to claim 21 wherein the audit application enables a supervisor to view specific client information, including suitability information, files, accounts and journals and further enables a supervisor to view files based on metadata searches.

33. The method according to claim 21 wherein the audit application automatically notifies supervisors and/or clients of filing inaccuracies.

34. The method according to claim 21 wherein the compliance application verifies the creation date of individual journal entries as well as the integrity of the underlying journal text.

35. The method according to claim 21 wherein the compliance application verifies the creator and creation date of individual product research entries as well as the integrity of the product research text.

36. The method according to claim 21 wherein the compliance application allows supervisors to assign and control file retention en masse for all users.

37. The method according to claim 21 wherein the compliance application stores information regarding specific compliance items as requested by a supervisor.

38. The method according to claim 21 wherein the compliance application alerts the user and supervisors to compliance items that are incomplete, incorrect or that otherwise need attention.

39. The method according to claim 21 wherein the compliance application tracks client login behavior.

40. The method according to claim 21 wherein the compliance application notifies clients of specific accounts that are not managed by the user affiliated with the client.

41. The method according to claim 21 wherein the compliance application keeps track of continuing education requirements of the user and notifies user of same.

42. The method according to claim 21 wherein the compliance application allows the supervisor to pre-populate product information and research for use by the user.

43. The method according to claim 21 wherein the management application calculates revenue generation estimates and the method of calculating revenue generation estimates at the investment product level.

44. The method according to claim 21 wherein the management application creates custom asset under management and commission and trail schedules.

45. The method according to claim 21 wherein the management application tracks and consolidates investment recommendations made to clients.

46. The method according to claim 21 wherein the management application allows the creation of complete work flow processes that can be made into templates and loaded again at a later time.

47. The method according to claim 21 wherein the portfolio application creates consolidated model portfolios based on individual investment products.

48. The method according to claim 21 wherein the portfolio application assigns model portfolios as target portfolios for individual clients.

49. The method according to claim 21 wherein the portfolio application displays the asset allocation balance for individual portfolios based on the difference between the actual portfolio's allocation against the target portfolio's allocation.

50. The method according to claim 21 wherein the portfolio application consolidates account information from external sources.

51. The method according to claim 21 wherein the portfolio application properly maintains account ownership and maintains balance sheets and other reports that reflect the same.

* * * * *